US012251800B2

(12) United States Patent
Mueckl et al.

(10) Patent No.: US 12,251,800 B2
(45) Date of Patent: Mar. 18, 2025

(54) SYSTEMS AND METHODS FOR DETECTING ANVIL POSITION USING A RELIEF FEATURE

(71) Applicant: MILWAUKEE ELECTRIC TOOL CORPORATION, Brookfield, WI (US)

(72) Inventors: Gareth Mueckl, Milwaukee, WI (US); Maxwell L. Merget, Milwaukee, WI (US); Douglas R. Fieldbinder, Greendale, WI (US); Justin A. Evankovich, Brookfield, WI (US); Jacob P. Schneider, Cedarburg, WI (US); Jonathan E. Abbott, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 377 days.

(21) Appl. No.: 17/350,617

(22) Filed: Jun. 17, 2021

(65) Prior Publication Data

US 2021/0394344 A1 Dec. 23, 2021

Related U.S. Application Data

(60) Provisional application No. 63/040,273, filed on Jun. 17, 2020.

(51) Int. Cl.
*B25B 23/147* (2006.01)
*B25B 21/02* (2006.01)

(52) U.S. Cl.
CPC ........ *B25B 23/1475* (2013.01); *B25B 21/023* (2013.01)

(58) Field of Classification Search
CPC .. B25B 23/1475; B25B 21/023; B25B 21/026
See application file for complete search history.

(56) References Cited

U.S. PATENT DOCUMENTS 6,484,814 B2 11/2002 Bongers-Ambrosius
9,321,159 B2 4/2016 May
(Continued)

FOREIGN PATENT DOCUMENTS

EP 2447006 A2 5/2012
JP H06160007 A 6/1994
(Continued)

OTHER PUBLICATIONS

International Search Report and Written Opinion for Application No. PCT/US2021/037834 dated Oct. 1, 2021 (12 pages).
(Continued)

*Primary Examiner* — Thomas M Wittenschlaeger
(74) *Attorney, Agent, or Firm* — Michael Best & Friedrich LLP

(57) ABSTRACT

A power tool including a housing, a brushless direct current (DC) motor, an impact mechanism including a hammer and an anvil, an output drive device, a position sensor, and a controller. The position sensor is adjacent to a relief feature, which may be a recessed relief feature or a raised relief feature, and is configured to generate an output signal indicative of a position of the anvil. The controller is configured to calculate a drive angle based on the determined position of the anvil, and control the brushless DC motor based on the drive angle of the anvil.

22 Claims, 24 Drawing Sheets

(56) References Cited

U.S. PATENT DOCUMENTS

| | | | |
|---|---|---|---|
| 9,539,715 B2 | 1/2017 | McClung | |
| 9,993,916 B2 | 6/2018 | Chen et al. | |
| 10,272,550 B2 | 4/2019 | Dey, IV et al. | |
| 10,583,545 B2 | 3/2020 | Dey, IV et al. | |
| 10,646,982 B2 * | 5/2020 | Dey, IV | B25B 21/02 |
| 2011/0058356 A1 | 3/2011 | Friedman et al. | |
| 2012/0234566 A1 | 9/2012 | Mashiko et al. | |
| 2013/0021783 A1 | 1/2013 | Vanko et al. | |
| 2014/0262394 A1 | 9/2014 | Scott et al. | |
| 2015/0000946 A1 * | 1/2015 | Amend | B25B 21/026 173/93 |
| 2015/0014005 A1 | 1/2015 | Puzio et al. | |
| 2015/0022125 A1 | 1/2015 | Takano et al. | |
| 2017/0173768 A1 * | 6/2017 | Dey, IV | B25F 5/00 |
| 2019/0030696 A1 | 1/2019 | Seith et al. | |
| 2019/0118353 A1 | 4/2019 | Woetzl et al. | |
| 2019/0171166 A1 | 6/2019 | Zanesco et al. | |
| 2019/0232471 A1 | 8/2019 | Paoli et al. | |
| 2020/0171632 A1 | 6/2020 | Dey, IV et al. | |
| 2020/0180128 A1 | 6/2020 | Schneider et al. | |
| 2021/0187717 A1 * | 6/2021 | McClung | B25B 21/02 |
| 2021/0379743 A1 | 12/2021 | Schneider et al. | |
| 2022/0040829 A1 | 2/2022 | Schneider et al. | |

FOREIGN PATENT DOCUMENTS

| | | | |
|---|---|---|---|
| JP | 2004066413 | A | 3/2004 |
| JP | 2013215884 | A | 10/2013 |
| KR | 1020140106190 | A | 9/2014 |
| KR | 1020170035400 | A | 3/2017 |
| WO | 2008139216 | A2 | 11/2008 |
| WO | 2018100802 | A1 | 6/2018 |
| WO | 2021016437 | A1 | 1/2021 |

OTHER PUBLICATIONS

Japanese Patent Office Action for Application No. 2022-573143 dated Dec. 5, 2023 (8 pages including machine English translation).

Extended European Search Report for Application No. 21825412.6 dated Jun. 12, 2024 (7 pages).

* cited by examiner

SYSTEMS AND METHODS FOR DETECTING ANVIL POSITION USING A RELIEF FEATURE

RELATED APPLICATIONS

This application claims priority to U.S. Provisional Patent Application No. 63/040,273, filed Jun. 17, 2020, the entire contents of which is incorporated by reference in its entirety.

FIELD

Embodiments described herein relate to power tools with impact mechanisms.

SUMMARY

Power tools described herein include a housing, a brushless direct current (DC) motor, an impact mechanism, an output drive device, a sensor, and a controller. The brushless DC motor is within the housing. The brushless DC motor includes a rotor and a stator. The rotor is coupled to a motor shaft to produce a rotational output. The impact mechanism includes a hammer coupled to the motor shaft and an anvil configured to receive impacts from the hammer. The anvil includes an anvil shaft and a relief feature provided on the anvil shaft. The relief feature has a profile that varies with a rotational position of the anvil shaft. The output drive device is coupled to the anvil and configured to rotate and/or move forward/backward to perform a task. The sensor is positioned adjacent the relief feature. The sensor is configured to generate an output signal indicative of at least one of a position of the anvil shaft and motion information of the anvil shaft (e.g., velocity or acceleration of the anvil shaft). The output signal indicative of the position of the anvil shaft includes a rotational position that varies based on rotational movement, a translational position that varies based on forward/backward movement, or a combination thereof. The motion information of the anvil shaft may include velocity information, acceleration information, or a combination thereof. The controller is coupled to the sensor and is configured to calculate a drive angle of the anvil caused by the impact based on the output signal, and control the brushless DC motor based on the drive angle of the anvil.

A sensor described herein includes a sensing element, a shaft, and a relief feature provided on the shaft. The relief feature has a profile that varies. The profile varies based on a rotational position of the shaft, a translational position, or a combination thereof. The sensor is positioned adjacent the relief feature. The sensor is configured to generate an output signal indicative of a position or motion of the shaft.

Methods described herein include driving a brushless direct current (DC) motor. The brushless DC motor includes a rotor and a stator. The rotor is coupled to a motor shaft to produce a rotational output. The method also includes impacting an anvil of an impact mechanism, by a hammer of the impact mechanism that is coupled to the motor shaft, to rotate an output drive device coupled to the anvil. The anvil includes an anvil shaft and a relief feature provided on the anvil shaft. The relief feature has a profile that varies with a rotational position of the anvil shaft, translational position of the anvil shaft, or a combination thereof. The method also includes sensing a position or motion of the anvil by a position sensor or a motion sensor. The sensor is positioned adjacent the relief feature. The sensor is configured to generate an output signal indicative of a position or motion of the anvil. The method also includes calculating a drive angle of the anvil based on the position or motion of the anvil and controlling the brushless DC motor based on the drive angle.

Methods described herein include receiving a first position or motion signal from the sensor at a first time, receiving a second position or motion signal from the sensor at a second time, calculating a drive angle of the anvil based on the first position or motion signal and the second position or motion signal, determining a drive angle experienced by the output drive device based on the drive angle of the anvil, and controlling the brushless DC motor based on the drive angle experienced by the output drive device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Other aspects of various embodiments will become apparent by consideration of the detailed description and accompanying drawings.

DETAILED DESCRIPTION

Figure 1:
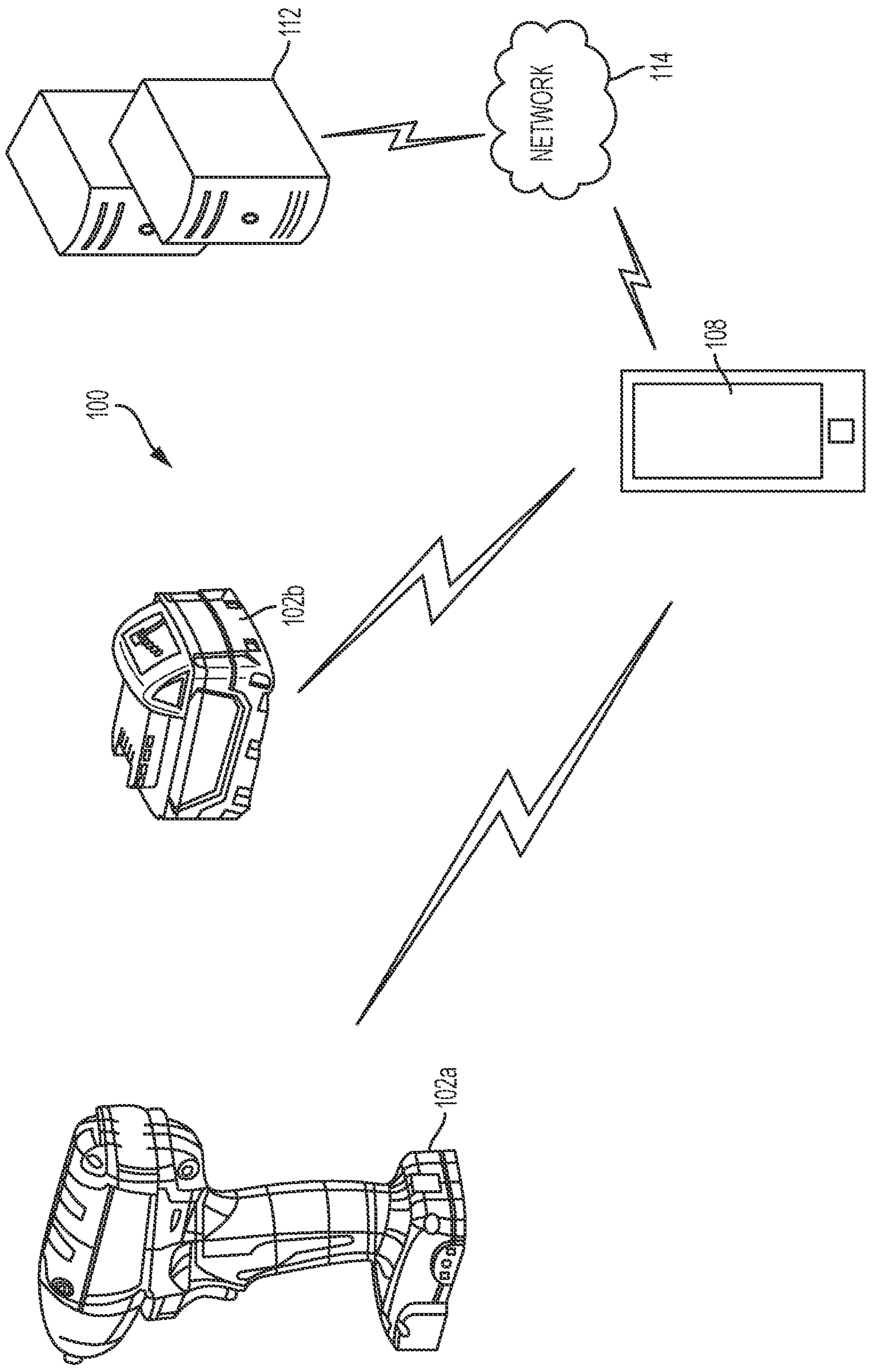
FIG. 1 illustrates a communication system according to one embodiment of the invention.

FIG. 1 illustrates a communication system 100. The communication system 100 includes power tool devices 102 and an external device 108. Each power tool device 102 (e.g., battery powered impact driver 102*a* and power tool battery pack 102*b*) and the external device 108 can communicate wirelessly while they are within a communication range of each other. Each power tool device 102 may communicate power tool status, power tool operation statistics, power tool identification, stored power tool usage information, power tool maintenance data, sensor information, and the like. Therefore, using the external device 108, a user can access stored power tool usage or power tool maintenance data. With this tool data, a user can determine how the power tool device 102 has been used, whether maintenance is recommended or has been performed in the past, and identify malfunctioning components or other reasons for certain performance issues. The external device 108 can also transmit data to the power tool device 102 for power tool configuration, firmware updates, or to send commands (e.g., turn on a work light). The external device 108 also allows a user to set operational parameters, safety parameters, select tool modes, and the like for the power tool device 102.

The external device 108 may be, for example, a smart phone (as illustrated), a laptop computer, a tablet computer, a personal digital assistant (PDA), or another electronic device capable of communicating wirelessly with the power tool device 102 and providing a user interface. The external device 108 provides the user interface and allows a user to access and interact with tool information. The external device 108 can receive user inputs to determine operational parameters, enable or disable features, and the like. The user interface of the external device 108 provides an easy-to-use interface for the user to control and customize operation of the power tool.

The external device 108 includes a communication interface that is compatible with a wireless communication interface or module of the power tool device 102. The communication interface of the external device 108 may include a wireless communication controller (e.g., a Bluetooth® module), or a similar component. The external device 108, therefore, grants the user access to data related to the power tool device 102, and provides a user interface such that the user can interact with the controller of the power tool device 102.

In addition, as shown in FIG. 1, the external device 108 can also share the information obtained from the power tool device 102 with a remote server 112 connected by a network 114. The remote server 112 may be used to store the data obtained from the external device 108, provide additional functionality and services to the user, or a combination thereof. In one embodiment, storing the information on the remote server 112 allows a user to access the information from a plurality of different locations. In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool device 102, typical usage of the power tool device 102, and other relevant characteristics and/or measures of the power tool device 102. The network 114 may include various networking elements (routers, hubs, switches, cellular towers, wired connections, wireless connections, etc.) for connecting to, for example, the Internet, a cellular data network, a local area network (LAN), a wide area network (WAN) or a combination thereof. In some embodiments, the power tool device 102 may be configured to communicate directly with the server 112 through an additional wireless communication interface or with the same wireless communication interface that the power tool device 102 uses to communicate with the external device 108.

The power tool device 102 is configured to perform one or more specific tasks (e.g., drilling, cutting, hammering, chiseling, fastening, pressing, lubricant application, sanding, heating, grinding, bending, forming, impacting, polishing, lighting, etc.). For example, the power tool device 102 could be a rotary hammer that detects motion, rotational movement, and/or translational movement of an anvil or another internal component. As another example, the power tool device could be an impact wrench associated with the task of generating a rotational output (e.g., to drive a bit). As another example, a hydraulic pulse tool (which also has an output anvil) may be associated with the task of driving a rotational output.

Figure 2:
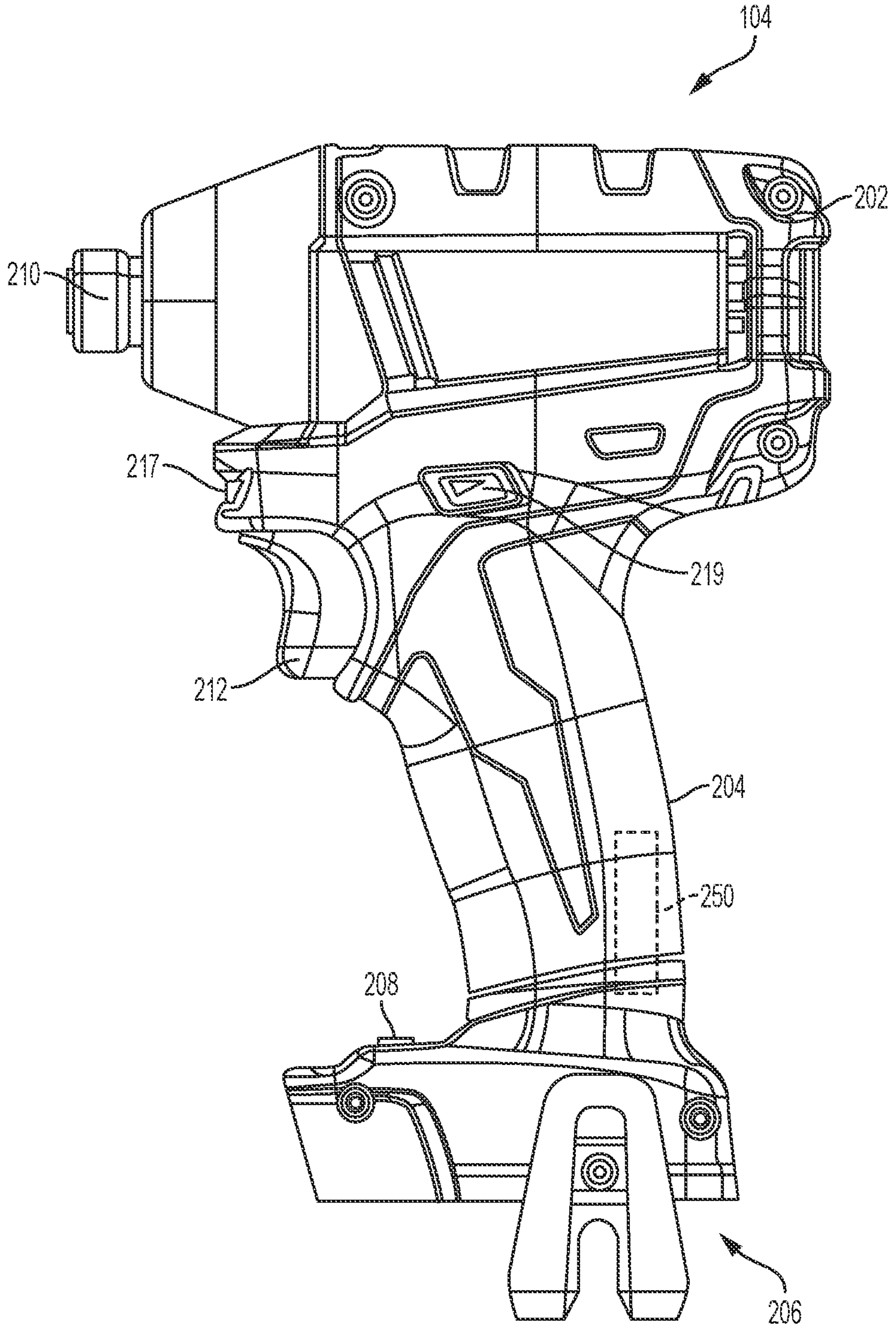
FIG. 2 illustrates a power tool of the communication system.

FIG. 2 illustrates an example of the power tool device 102, as an impact driver 104. The impact driver 104 is representative of various types of power tools that operate within the system 100. Accordingly, the description with respect to the impact driver 104 in the system 100 is similarly applicable to other types of power tools, such as other power tools with impact mechanisms (e.g., impact wrenches and impacting angle drivers) and other suitable power tools. As shown in FIG. 2, the impact driver 104 includes an upper main body 202, a handle 204, a battery pack receiving portion 206, a mode pad 208, an output drive device 210, a trigger 212, a work light 217, and a forward/reverse selector 219. The housing of the impact driver 104

(e.g., the main body 202 and the handle 204) are composed of a durable and light-weight plastic material. The drive device 210 is composed of a metal (e.g., steel). The drive device 210 on the impact driver 104 is a socket. However, other power tools may have a different drive device 210 specifically designed for the task associated with the other power tool. The battery pack receiving portion 206 is configured to receive and couple to the battery pack (e.g., 102*b* of FIG. 1) that provides power to the impact driver 104. The battery pack receiving portion 206 includes a connecting structure to engage a mechanism that secures the battery pack and a terminal block to electrically connect the battery pack to the impact driver 104. The mode pad 208 allows a user to select a mode of the impact driver 104 and indicates to the user the currently selected mode of the impact driver 104, which are described in greater detail below.

Figure 3A:
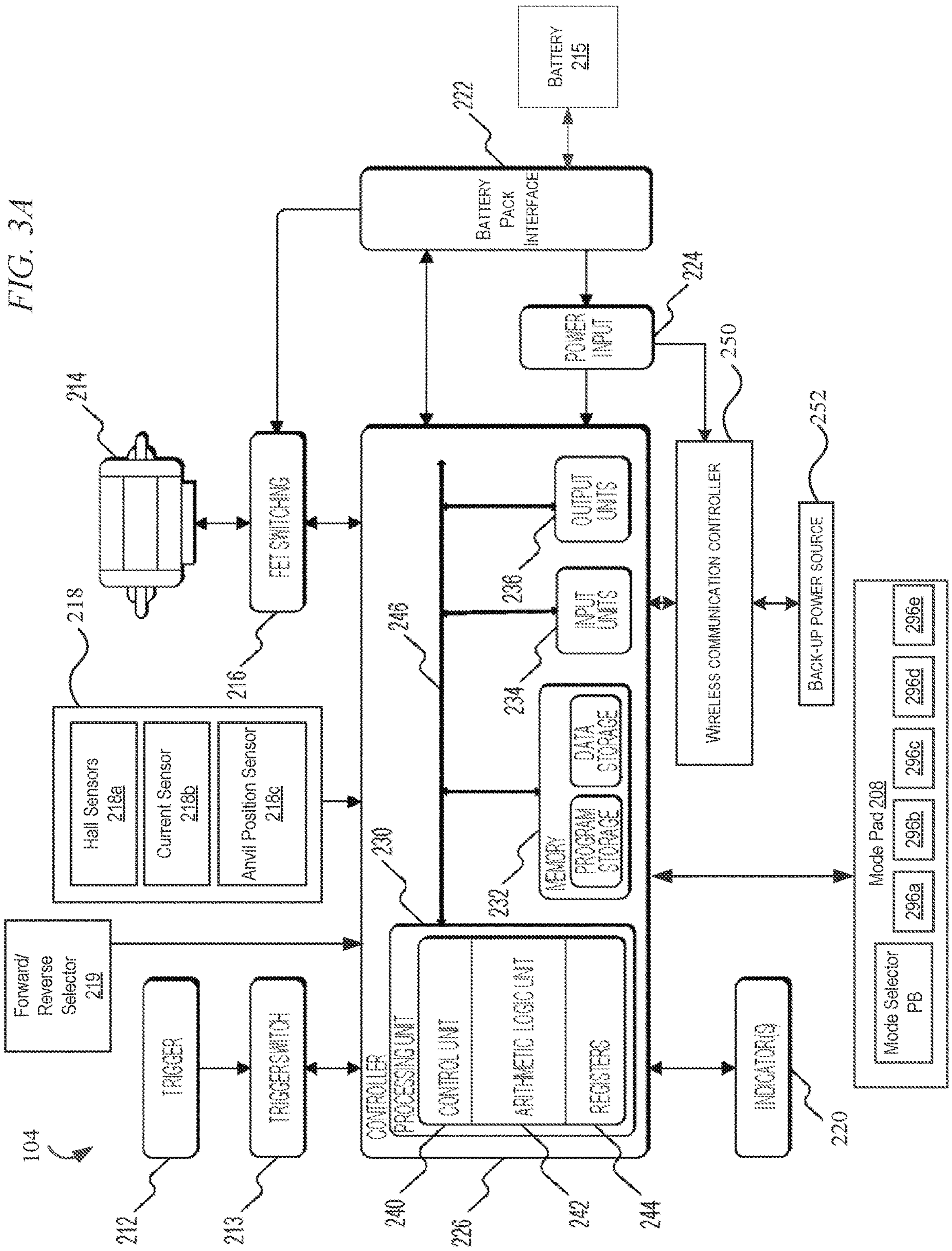
FIGS. 3A and 3B illustrate a schematic diagram of the power tool.

As shown in FIG. 3A, the impact driver 104 also includes a motor 214. The motor 214 actuates the drive device 210 and allows the drive device 210 to perform the particular task. A primary power source (e.g., a battery pack) 215 couples to the impact driver 104 and provides electrical power to energize the motor 214. The motor 214 is energized based on the position of the trigger 212. When the trigger 212 is depressed the motor 214 is energized, and when the trigger 212 is released, the motor 214 is de-energized. In the illustrated embodiment, the trigger 212 extends partially down a length of the handle 204; however, in other embodiments the trigger 212 extends down the entire length of the handle 204 or may be positioned elsewhere on the impact driver 104. The trigger 212 is moveably coupled to the handle 204 such that the trigger 212 moves with respect to the tool housing. The trigger 212 is coupled to a push rod, which is engageable with a trigger switch 213 (see FIG. 3A). The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the push rod activates the trigger switch 213, and when the trigger 212 is released by the user, the trigger switch 213 is deactivated. In other embodiments, the trigger 212 is coupled to an electrical trigger switch 213. In such embodiments, the trigger switch 213 may include, for example, a transistor. Additionally, for such electrical trigger switch embodiments, the trigger 212 may not include a push rod to activate a mechanical switch. Rather, the electrical trigger switch 213 may be activated by, for example, a position sensor (e.g., a Hall-Effect sensor) that relays information about the relative position of the trigger 212 to the tool housing or electrical trigger switch 213. The trigger switch 213 outputs a signal indicative of the position of the trigger 212. In some instances, the signal is binary and indicates either that the trigger 212 is depressed or released. In other instances, the signal indicates the position of the trigger 212 with more precision. For example, the trigger switch 213 may output an analog signal that various from 0 to 5 volts depending on the extent that the trigger 212 is depressed. For example, 0 V output indicates that the trigger 212 is released, 1 V output indicates that the trigger 212 is 20% depressed, 2 V output indicates that the trigger 212 is 40% depressed, 3 V output indicates that the trigger 212 is 60% depressed 4 V output indicates that the trigger 212 is 80% depressed, and 5 V indicates that the trigger 212 is 100% depressed. However, these are merely examples and alternative thresholds (and an alternative number of thresholds) may be used to provide different gradients of depression precision. The signal output by the trigger switch 213 may be analog or digital.

As also shown in FIG. 3A, the impact driver 104 also includes a switching network 216, sensors 218, indicators 220, the battery pack interface 222, a power input unit 224, a controller 226, a wireless communication controller 250, and a back-up power source 252. The back-up power source 252 includes, in some embodiments, a coin cell battery (FIG. 4) or another similar small replaceable power source. The battery pack interface 222 is coupled to the controller 226 and couples to the battery pack 215. The battery pack interface 222 includes a combination of mechanical (e.g., the battery pack receiving portion 206) and electrical components configured to and operable for interfacing (e.g., mechanically, electrically, and communicatively connecting) the impact driver 104 with the battery pack 215. The battery pack interface 222 is coupled to the power input unit 224. The battery pack interface 222 transmits the power received from the battery pack 215 to the power input unit 224. The power input unit 224 includes active and/or passive components (e.g., voltage step-down controllers, voltage converters, rectifiers, filters, etc.) to regulate or control the power received through the battery pack interface 222 and to the wireless communication controller 250 and controller 226.

The switching network 216 enables the controller 226 to control the operation of the motor 214. Generally, when the trigger 212 is depressed as indicated by an output of the trigger switch 213, electrical current is supplied from the battery pack interface 222 to the motor 214, via the switching network 216. When the trigger 212 is not depressed, electrical current is not supplied from the battery pack interface 222 to the motor 214.

In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous field-effect transistors ("FETs"), bipolar transistors, or other types of electrical switches. For instance, the switching network 216 may include a six-FET bridge that receives pulse-width modulated ("PWM") signals from the controller 226 to drive the motor 214.

The sensors 218 are coupled to the controller 226 and communicate to the controller 226 various signals indicative of different parameters of the impact driver 104 or the motor 214. The sensors 218 include one or more Hall sensors 218*a*, one or more current sensors 218*b*, one or more anvil position sensors 218*c*, among other sensors, such as, for example, one or more voltage sensors, one or more temperature sensors, one or more motion sensors (e.g., a gyroscope), and one or more torque sensors. Each Hall sensor 218*a* outputs motor feedback information to the controller 226, such as an indication (e.g., a pulse) when a magnet of the motor's rotor rotates across the face of that Hall sensor. Based on the motor feedback information from the Hall sensors 218*a*, the controller 226 can determine the position, velocity, and acceleration of the rotor. In response to the motor feedback information and the signals from the trigger switch 213, the controller 226 transmits control signals to control the switching network 216 to drive the motor 214. For instance, by selectively enabling and disabling the FETs of the switching network 216, power received via the battery pack interface 222 is selectively applied to stator coils of the motor 214 to cause rotation of its rotor. The motor feedback information is used by the controller 226 to ensure proper timing of control signals to the switching network 216 and, in some instances, to provide closed-loop feedback to control the speed of the motor 214 to be at a desired level.

The indicators 220 are also coupled to the controller 226 and receive control signals from the controller 226 to turn on and off or otherwise convey information based on different states of the impact driver 104. The indicators 220 include, for example, one or more light-emitting diodes ("LEDs"), or a display screen. The indicators 220 can be configured to display conditions of, or information associated with, the impact driver 104. For example, the indicators 220 are configured to indicate measured electrical characteristics of the impact driver 104, the status of the impact driver 104, the mode of the power tool (e.g., as discussed below), etc. The indicators 220 may also include elements to convey information to a user through audible or tactile outputs.

As described above, the controller 226 is electrically and/or communicatively connected to a variety of modules or components of the impact driver 104. In some embodiments, the controller 226 includes a plurality of electrical and electronic components that provide power, operational control, and protection to the components and modules within the controller 226 and/or impact driver 104. For example, the controller 226 includes, among other things, a processing unit 230 (e.g., a microprocessor, a microcontroller, electronic processor, electronic controller, or another suitable programmable device), a memory 232, input units 234, and output units 236. The processing unit 230 (herein, electronic processor 230) includes, among other things, a control unit 240, an arithmetic logic unit ("ALU") 242, and a plurality of registers 244 (shown as a group of registers in FIG. 3A). In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area and a data storage area. The program storage area and the data storage area can include combinations of different types of memory, such as a read-only memory ("ROM"), a random access memory ("RAM") (e.g., dynamic RAM ["DRAM"], a synchronous DRAM ["SDRAM"], etc.), an electrically erasable programmable read-only memory ("EEPROM"), a flash memory, a hard disk, a secure digital ("SD") card, or other suitable magnetic, optical, physical, or electronic memory device(s). The electronic processor 230 is connected to the memory 232 and executes software instructions that are stored in a memory 232 (e.g., RAM 232 during execution, a ROM 232 on a generally permanent basis, and/or another non-transitory computer readable medium such as another memory or a disc). Software included in the implementation of the impact driver 104 can be stored in the memory 232 of the controller 226 (e.g., in the program storage area). The software includes, for example, firmware, one or more applications, program data, filters, rules, one or more program modules, and other executable instructions. The controller 226 is configured to retrieve from memory and execute, among other things, instructions related to the control processes and methods described herein. The controller 226 is also configured to store power tool information on the memory 232 including operational data, information identifying the type of tool, a unique identifier for the particular tool, and other information relevant to operating or maintaining the impact driver 104. The tool usage information, such as current levels, motor speed, motor acceleration, motor direction, number of impacts, may be captured or inferred from data output by the sensor(s) 218. Such power tool information may then be accessed by a user with the external device 108. In other constructions, the controller 226 includes additional, fewer, or different components.

The wireless communication controller 250 is coupled to the controller 226. In the illustrated embodiment, the wireless communication controller 250 is located near the foot of the impact driver 104 (see FIG. 2) to save space and ensure that the magnetic activity of the motor 214 does not affect the wireless communication between the impact driver 104 and the external device 108. As a particular example, in some embodiments, the wireless communication controller 250 is positioned under the mode pad 208.

Figure 3B:
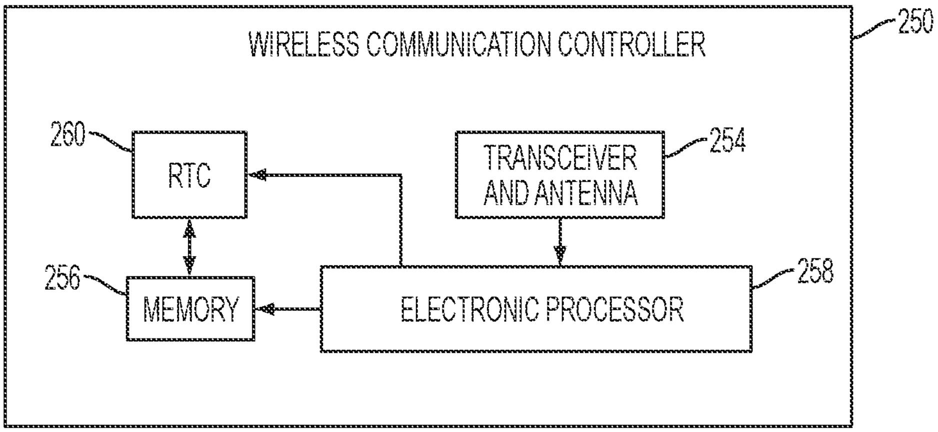

As shown in FIG. 3B, the wireless communication controller 250 includes a radio transceiver and antenna 254, a memory 256, an electronic processor 258, and a real-time clock ("RTC") 260. The radio transceiver and antenna 254 operate together to send and receive wireless messages to and from the external device 108 and the electronic processor 258. The memory 256 can store instructions to be implemented by the electronic processor 258 and/or may store data related to communications between the impact driver 104 and the external device 108 or the like. The electronic processor 258 for the wireless communication controller 250 controls wireless communications between the impact driver 104 and the external device 108. For example, the electronic processor 258 associated with the wireless communication controller 250 buffers incoming and/or outgoing data, communicates with the controller 226, and determines the communication protocol and/or settings to use in wireless communications.

In the illustrated embodiment, the wireless communication controller 250 is a Bluetooth® controller. The Bluetooth® controller communicates with the external device 108 employing the Bluetooth® protocol. Therefore, in the illustrated embodiment, the external device 108 and the impact driver 104 are within a communication range (i.e., in proximity) of each other while they exchange data. In other embodiments, the wireless communication controller 250 communicates using other protocols (e.g., Wi-Fi®, cellular protocols, a proprietary protocol, etc.) over a different type of wireless network. For example, the wireless communication controller 250 may be configured to communicate via Wi-Fi through a WAN such as the Internet or a LAN, or to communicate through a piconet (e.g., using infrared communication or near-field communications ("NFC")). The communication via the wireless communication controller 250 may be encrypted to protect the data exchanged between the impact driver 104 and the external device/network 108 from third parties.

The wireless communication controller 250 is configured to receive data from the power tool controller 226 and relay the information to the external device 108 via the transceiver and antenna 254. In a similar manner, the wireless communication controller 250 is configured to receive information (e.g., configuration and programming information) from the external device 108 via the transceiver and antenna 254 and relay the information to the power tool controller 226.

The RTC 260 increments and keeps time independently of the other power tool components. The RTC 260 receives power from the battery pack 215 when the battery pack 215 is connected to the impact driver 104 and receives power from the back-up power source 252 when the battery pack 215 is not connected to the impact driver 104. Having the RTC 260 as an independently powered clock enables time stamping of operational data (stored in memory 232 for later export) and a security feature whereby a lockout time is set by a user and the tool is locked-out when the time of the RTC 260 exceeds the set lockout time.

The memory 232 stores various identifying information of the impact driver 104 including a unique binary identifier (UBID), an American Standard Code for Information Interchange ["ASCII"] serial number, an ASCII nickname, and a decimal catalog number. The UBID both uniquely identifies the type of tool and provides a unique serial number for each impact driver 104. Additional or alternative techniques for uniquely identifying the impact driver 104 are used in some embodiments.

Figure 4:
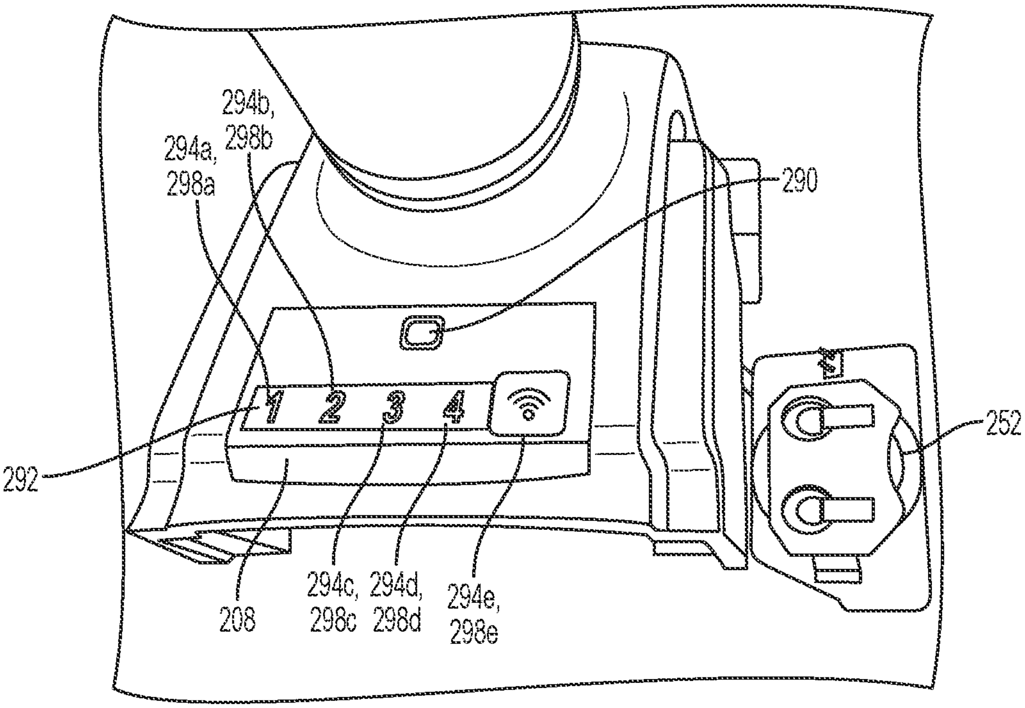
FIG. 4 illustrates a mode pad of the power tool.

FIG. 4 illustrates a more detailed view of the mode pad 208. The mode pad 208 is a user interface on an outer surface of the impact driver 104 that allows the impact driver 104 to switch between different operating modes. The mode pad 208 includes the mode selection switch 290 and mode indicator LEDs block 292 having mode indicators 294*a-e*, each mode indicator 294*a-e* including one of LEDs 296*a-e* (see FIG. 3A) and an associated one of indicating symbols 298*a-e* (e.g., "1", "2", "3", "4", and a radio wave symbol). When an LED 296 is enabled, the associated indicating symbol 298 is illuminated. For instance, when LED 296*a* is enabled, the "1" (indicating symbol 298*a*) is illuminated.

The impact driver 104 has five selectable modes (one, two, three, four, and adaptive), each associated with a different one of the mode indicators 294*a-e*. The mode selection switch 290 is a pushbutton that cycles through the five selectable modes upon each press (e.g., mode 1, 2, 3, 4, adaptive, 1, 2, and so on). The adaptive mode is represented by the indicating symbol 298*e* (the radio wave symbol). In the adaptive mode, the user is able to configure the impact driver 104 via the external device 108, as is described in further detail below. In other embodiments, the impact driver 104 has more or fewer modes, and the mode selection switch 290 may be a different type of switch such as, for example, a slide switch, a rotary switch, or the like.

Figure 5:
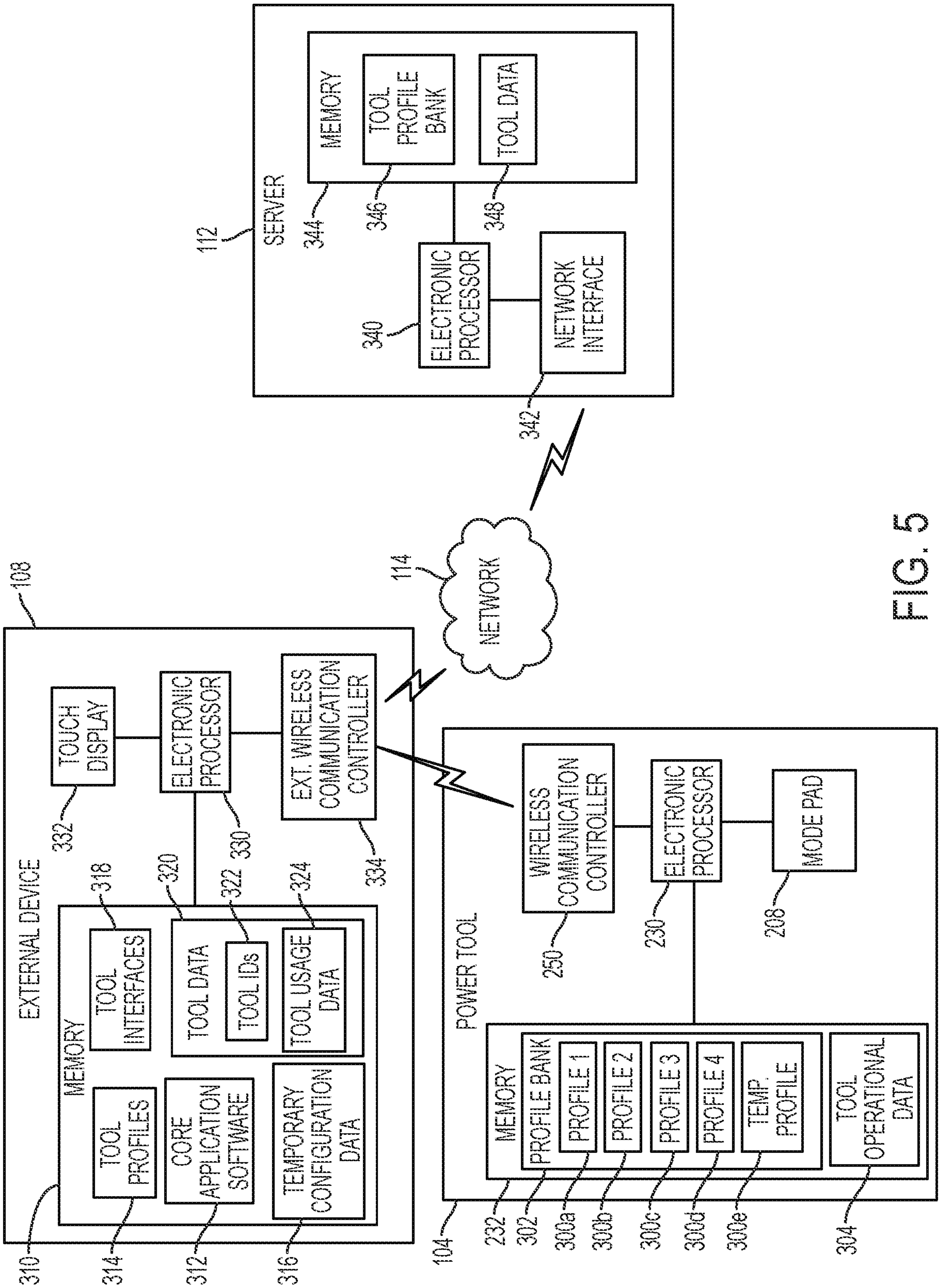
FIG. 5 illustrates a schematic diagram of the communication system including the power tool.

With reference to FIG. 5, modes one, two, three, and four are each associated with a mode profile configuration data block (a "mode profile") 300*a-d*, respectively, saved in the memory 232 in a (mode) profile bank 302. Each mode profile 300 includes configuration data that defines the operation of the tool 104 when activated by the user (e.g., upon depressing the trigger 212). For instance, a particular mode profile 300 may specify the motor speed, when to stop the motor, the duration and intensity of the work light 217, among other operational characteristics. The adaptive mode is associated with a temporary mode profile 300*e* saved in the memory 232. Also stored in the memory 232 is tool operational data 304, which includes, for example, information regarding the usage of the impact driver 104 (e.g., obtained via the sensors 218), information regarding the maintenance of the impact driver 104, power tool trigger event information (e.g., whether and when the trigger is depressed and the amount of depression).

The external device 108 includes a memory 310 storing core application software 312, tool mode profiles 314, temporary configuration data 316, tool interfaces 318, tool data 320 including received tool identifiers 322 and received tool usage data 324 (e.g., tool operational data). The external device 108 further includes an electronic processor 330, a touch screen display 332, and an external wireless communication controller 334. The electronic processor 330 and memory 310 may be part of a controller having similar components as the controller 226 of the impact driver 104. The touch screen display 332 allows the external device 108 to output visual data to a user and receive user inputs. Although not illustrated, the external device 108 may include further user input devices (e.g., buttons, dials, toggle switches, and a microphone for voice control) and further user outputs (e.g., speakers and tactile feedback elements). Additionally, in some instances, the external device 108 has a display without touch screen input capability and receives user input via other input devices, such as buttons, dials, and toggle switches. The external device 108 communicates wirelessly with the wireless communication controller 250 via the external wireless communication controller 334, e.g., using a Bluetooth® or Wi-Fi® protocol. The external wireless communication controller 334 further communicates with the server 112 over the network 114. The external wireless communication controller 334 includes at least one transceiver to enable wireless communications between the external device 108 and the wireless communication controller 250 of the power tool 104 or the server 112 through the network 114. In some instances, the external wireless communication controller 334 includes two separate wireless communication controllers, one for communicating with the wireless communication controller 250 (e.g., using Bluetooth® or Wi-Fi® communications) and one for communicating through the network 114 (e.g., using Wi-Fi or cellular communications).

The server 112 includes an electronic processor 340 that communicates with the external device 108 over the network 114 using a network interface 342. The communication link between the network interface 342, the network 114, and the external wireless communication controller 334 may include various wired and wireless communication pathways, various network components, and various communication protocols. The server 112 further includes a memory 344 including a tool profile bank 346 and tool data 348.

Returning to the external device 108, the core application software 312 is executed by the electronic processor 330 to generate a graphical user interface (GUI) on the touch screen display 332 enabling the user to interact with the impact driver 104 and server 112. In some embodiments, a user may access a repository of software applications (e.g., an "app store" or "app marketplace") using the external device 108 to locate and download the core application software 312, which may be referred to as an "app." In some embodiments, the tool mode profiles 314, tool interfaces 318, or both may be bundled with the core application software 312 such that, for instance, downloading the "app" includes downloading the core application software 312, tool mode profiles 314, and tool interfaces 318. In some embodiments, the app is obtained using other techniques, such as downloading from a website using a web browser on the external device 108. As will become apparent from the description below, at least in some embodiments, the app on the external device 108 provides a user with a single entry point for controlling, accessing, and/or interacting with a multitude of different types of tools. This approach contrasts with, for instance, having a unique app for each type of tool or for small groupings of related types of tools.

Figure 6:
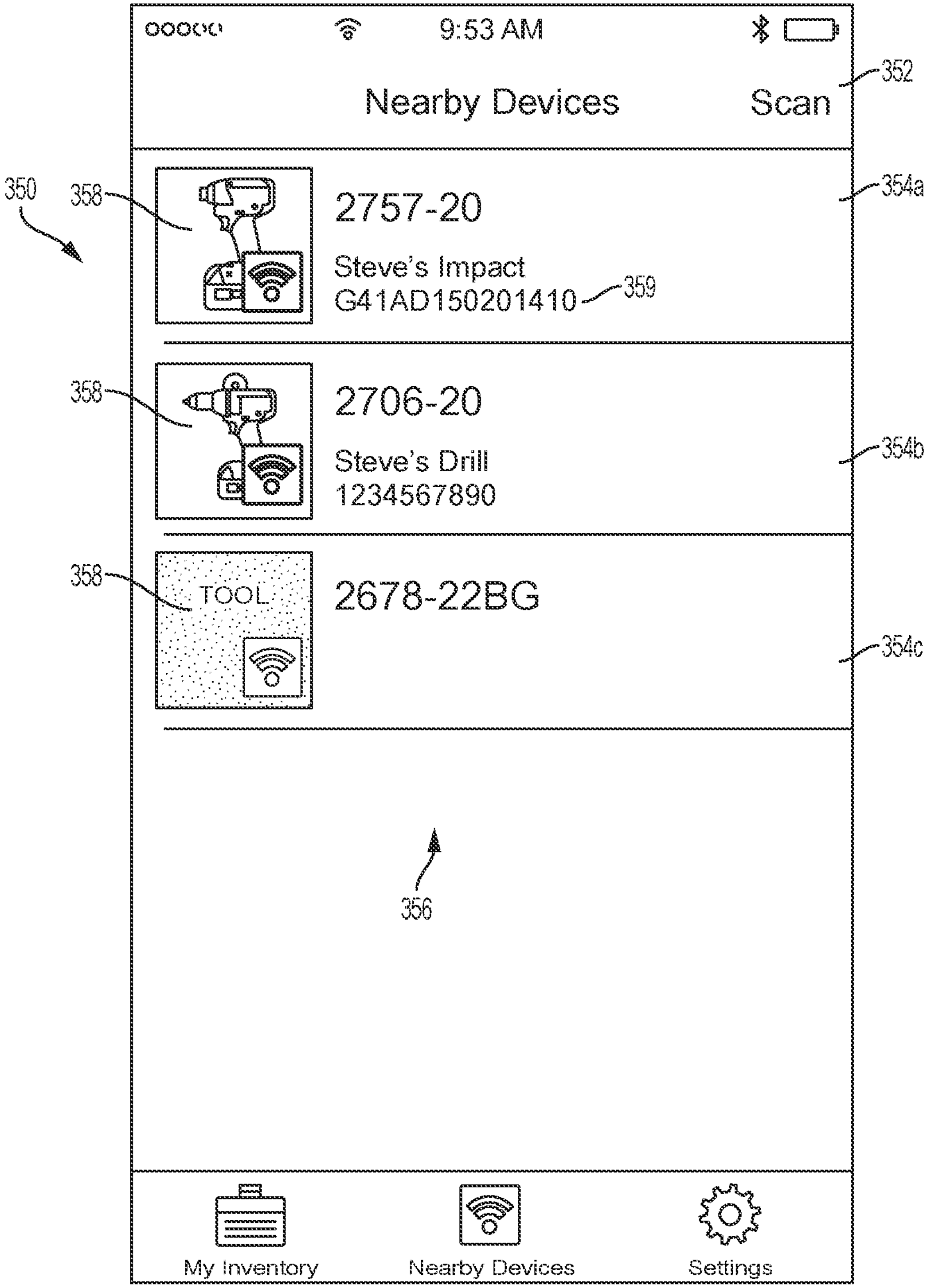
FIGS. 6, 7, 8A, 8B, 9, 10, and 11 illustrate exemplary screenshots of a user interface of an external device of the communication system.

FIG. 6 illustrates a nearby devices screen 350 of the GUI on the touch screen display 332. The nearby devices screen 350 is used to identify and communicatively pair with power tools 102 within wireless communication range of the external device 108 (e.g., local power tools). For instance, in response to a user selecting the "scan" input 352, the external wireless communication controller 334 scans a radio wave communication spectrum used by the power tools 102 and identifies any power tools 102 within the wireless communication range that are advertising (e.g., broadcasting their UBID and other limited information). The identified power tools 102 that are advertising are then listed on the nearby devices screen 350. As shown in FIG. 6, in response to a scan, three power tools 102 that are advertising (advertising tools 354*a-c*) are listed in the identified tool list 356. In some embodiments, if a power tool 102 is already communicatively paired with a different external device, the power tool 102 is not advertising and, as such, is not listed in the identified tool list 356 even though the power tool 102 may be nearby (within a wireless communication range of) the external device 108. The external device 108 is operable to pair with tools 354 that are in a connectable state. The external device 108 provides a visual state indication 358 in the identified tool list 356 of whether an advertising tool 354 is in the connectable state or the advertising state. For instance, the visual state indication 358 of a tool may be displayed in one color when the tool is in a connectable state and may be displayed in another color when the tool is not in the connectable state. The UBID received from the tools 354 is used by the external device 108 to identify the tool type of each tool 354, and the respective visual state indication 358, which may include an icon or thumbnail image associated with the type of tool (e.g., a thumbnail image of an impact driver overlaid with a Wi-Fi® icon, as shown for advertising tool 354*a*).

From the nearby devices screen 350, a user can select one of the tools 354 from the identified tool list 356 to communicatively pair with the selected tool 354. Each type of power tool 354 with which the external device 108 can communicate includes an associated tool graphical user interface (tool interface) stored in the tool interfaces 318. Once a communicative pairing occurs, the core application software 312 accesses the tool interfaces 318 (e.g., using the UBID) to obtain the applicable tool interface for the type of tool that is paired. The touch screen display 332 then shows the applicable tool interface. A tool interface includes a series of screens enabling a user to obtain tool operational data, configure the tool, or both. While some screens and options of a tool interface are common to multiple tool interfaces of different tool types, generally, each tool interface includes screens and options particular to the associated type of tool. According to an embodiment, the impact driver 104 may have limited space for user input buttons, triggers, switches, and dials. However, the external device 108 and touch screen display 332 provide a user the ability to map additional functionality and configurations to the impact driver 104 to change the operation of the impact driver 104. Thus, in effect, the external device 108 provides an extended user interface for the impact driver 104, providing further customization and configuration of the impact driver 104 than otherwise possible or desirable through physical user interface components on the tool. Examples further explaining aspects and benefits of the extended user interface are found below.

Figure 7:
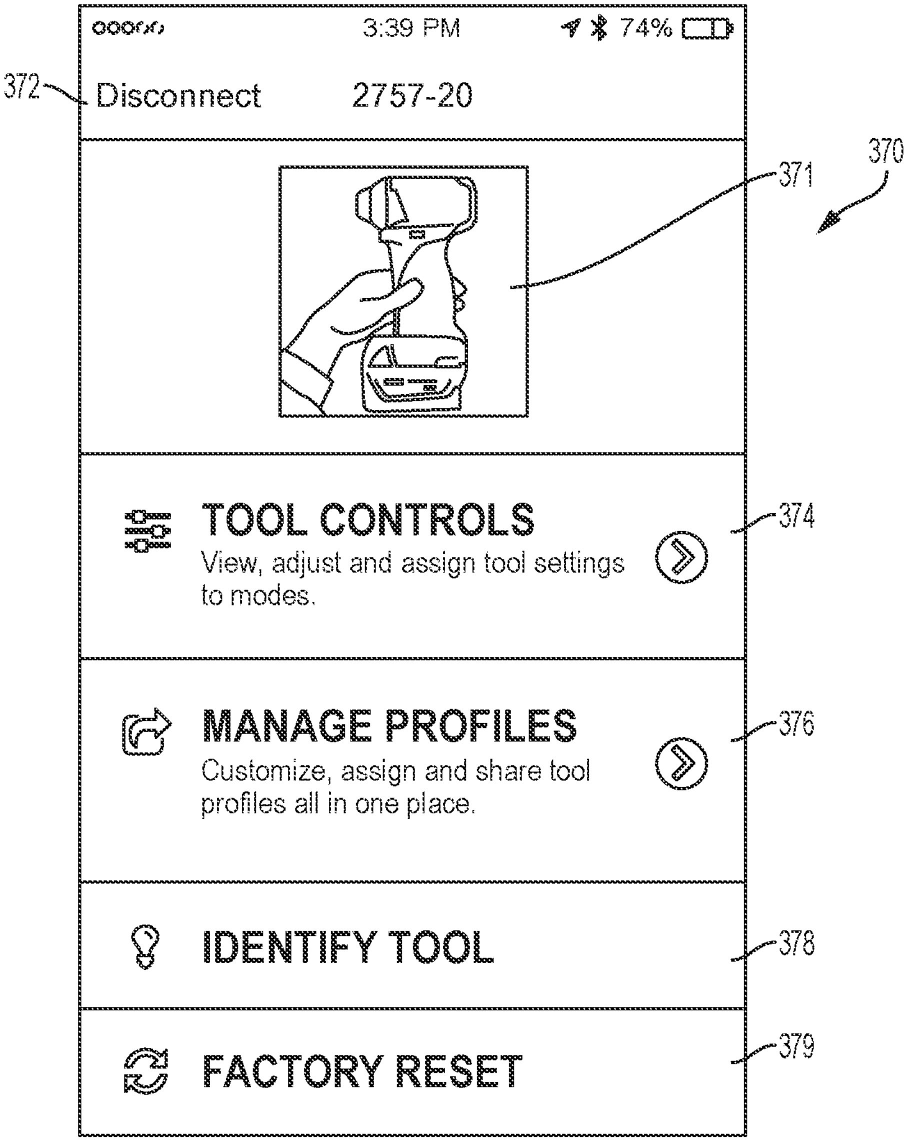

FIG. 7 illustrates a home screen 370 of the tool interface when the power tool 104 is an impact driver. The home screen 370 includes an icon 371 for the particular paired powered tool (e.g., impact driver 104), which may be the same as the thumbnail image or icon 358 shown in the list 356 without the overlaid Wi-Fi® icon. The home screen 370 also includes a disconnect input 372 enabling the user to break the communicative pairing between the external device 108 and the paired impact driver 104. The home screen 370 further includes four selectable options: tool controls 374, manage profiles 376, identify tool 378, and factory reset 379. Selecting identify tool 378 sends a command to the paired impact driver 104 requesting that the paired impact driver 104 provide a user-perceptible indication, such as flashing a work light 217, a light of the indicator 220, flashing LEDs 296, making an audible beep using a speaker of the indicators 220, and/or using the motor 214 to vibrate the tool. The user can then identify the particular tool communicating with the external device 108.

Figure 8B:
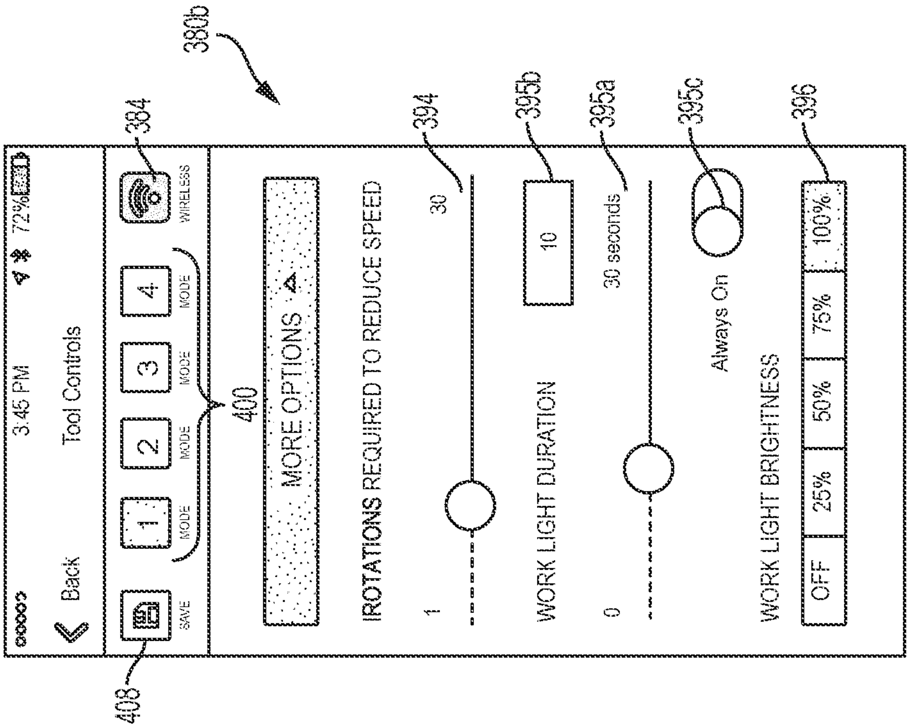
Figure 8A:
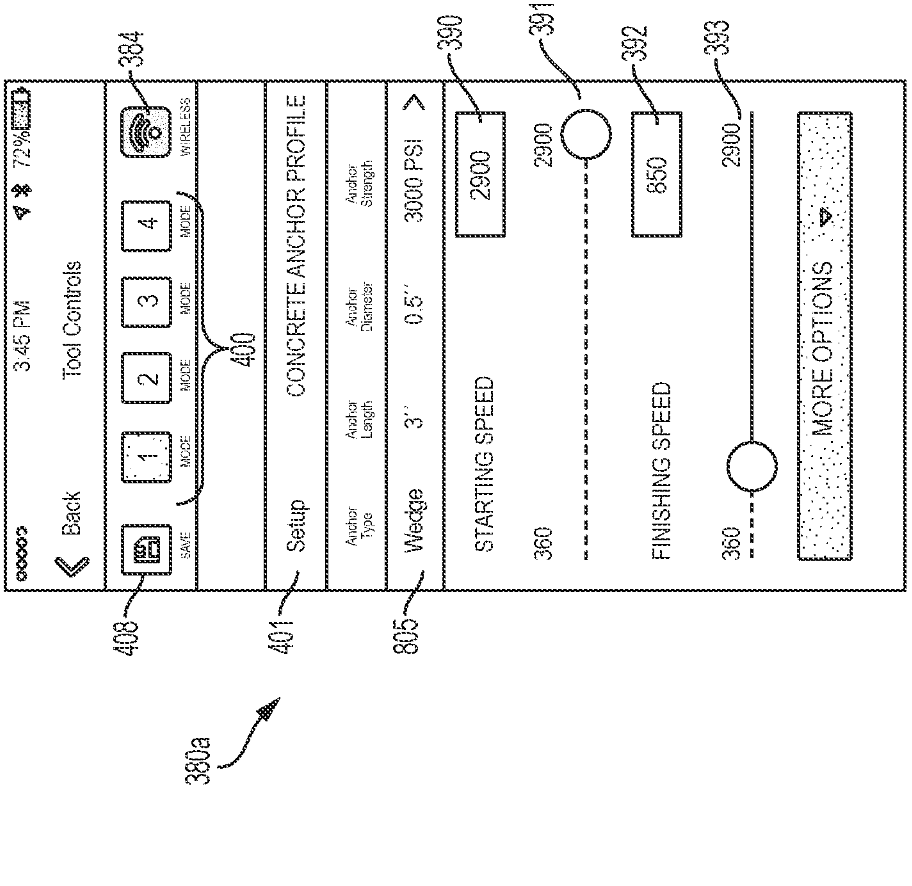

Selecting tool controls 374 causes a control screen of the tool interface to be shown, such as the control screen 380 of FIGS. 8A-B, which includes a top portion 380*a* and a bottom portion 380*b*. Generally, the control screen displayed depends on the particular type of profile. In other words, generally, each type of mode profile has a specific control screen. Each control screen has certain customizable parameters that, taken together, form a mode profile. The particular control screen displayed by the external device 108 upon selecting the tool controls 374 is the currently selected mode profile of the impact driver 104 (e.g., one of the mode profiles 300*a-e*). To this end, upon selection of the tool controls option 374, the external device 108 requests and receives the currently selected one of the mode profiles 300*a-e* from the impact driver 104. The external device 108 recognizes the mode profile type of the selected one of the mode profiles 300*a-e*, generates the appropriate control screen for the mode profile type, and populates the various parameter settings according to settings from the received mode profile 300.

When the impact driver 104 is operating in the adaptive mode, the currently selected mode profile that is displayed on the control screen 380 of the external device 108 is stored as the temporary mode profile 300*e* in the external device 108. Additionally, when the impact driver 104 is in the adaptive mode, the impact driver 104 is operated according to the temporary mode profile 300*e*. The source of profile data in the temporary mode profile 300*e* (and what is being displayed on the control screen 380) varies. Initially, upon entering the adaptive mode via the mode selection switch 290, the mode profile 300*a* (associated with mode 1) is copied into the temporary mode profile 300*e* of the impact driver 104. Thus, after a user causes the impact driver 104 to enter the adaptive mode using the mode selection switch 290, the impact driver 104 initially operates upon a trigger pull as if mode 1 (mode profile 300*a*) was currently selected. Additionally, as the control screen 380 displays the mode profile saved as the temporarily mode profile 300*e*, information (mode profile type and mode profile parameters) related to the mode profile 300*a* that was just copied to the temporary mode profile 300*e* is displayed on the control screen.

In some embodiments, another mode profile 300 (e.g., 300*b-d*) is copied into the temporary mode profile 300*e* upon first entering the adaptive mode and is provided (as the temporary mode profile 300*e*) to the external device 108 for populating the control screen 380. In still other embodiments, the control screen 380 displayed upon selecting the tool controls 374 is a default control screen with default profile data for the particular type of tool, and the external device 108 does not first obtain profile data from the impact driver 104. In these instances, the default mode profile is sent to the impact driver 104 and saved as the temporary mode profile 300*e*.

Further, assuming that the impact driver 104 is in the adaptive mode, after the external device 108 initially loads the control screen (e.g., control screen 380) upon selecting the tool controls 374, the user may select a new source of profile data for the temporary file. For instance, upon selecting one of the mode profile buttons 400 (e.g., mode 1, mode 2, mode 3, or mode 4) the associated mode profile

Figure 9:
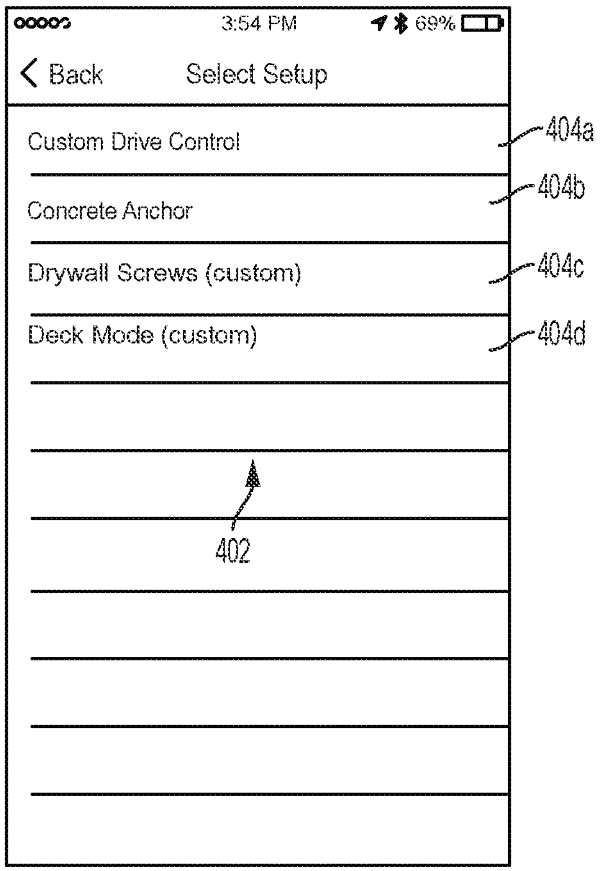

300*a-d* is saved as the temporary mode profile 300*e* and sent to the external device 108 and populates the control screen (according to the mode profile type and mode profile parameters). Additionally, assuming the impact driver 104 is in the adaptive mode, a user may select a mode profile type using the setup selector 401. Upon selecting the setup selector 401, a list of available profiles (profile list) 402 for the particular type of paired impact driver 104 is shown (see, e.g., FIG. 9). The profile list 402 includes profiles 404 obtained from tool profiles 314 and/or from the tool profile bank 346 over the network 114. These listed profiles 404 include default profiles (custom drive control profile 404*a* and concrete anchor profile 404*b*) and custom profiles previously generated and saved by a user (e.g., drywall screws profile 404*c* and deck mode 404*d*), as is described in more detail below. Upon selecting one of the tool profiles 404, the selected profile 404 and its default parameters are illustrated on the control screen 380 of the external device 108 and the profile 404 as currently configured is sent to the impact driver 104 and saved as the temporary mode profile 300*e*. Accordingly, upon a further trigger pull, the impact driver 104 will operate according to the selected one of the tool profiles 404.

When the adaptive mode is currently selected on the impact driver 104, as indicated by the indicating symbol 298*e* (FIG. 4) being illuminated, the user is able to configure (e.g. change some of the parameters of the temporary mode profile 300*e*) the impact driver 104 using the control screen 380. When the impact driver 104 is in one of the other four tool modes, as indicated by one of the indicating symbols 298*a-d*, the impact driver 104 is not currently configurable via the control screen 380. For instance, in FIG. 10, a control screen 381 is illustrated when the power tool (e.g., impact driver 104) is not currently in the adaptive mode. Here, the control screen 381 is similar to the control screen 380, but includes a message 382 indicating that the power tool (e.g., impact driver 104) is not in the adaptive mode and a wireless symbol 384 is shown greyed-out as a further indication that the power tool (e.g., impact driver 104) is not in the adaptive mode. Accordingly, when the impact driver 104 is not in the adaptive mode and a user selects one of the mode profile buttons 400, the impact driver 104 provides the mode profile 300 of the associated mode selected by the user, but does not overwrite the temporary mode profile 300*e* with the selected mode profile. Thus, the mode profiles 300 of the impact driver 104 are not updated when the impact driver 104 is not in the adaptive mode.

Referring back to FIGS. 8A-B, when the impact driver 104 is in the adaptive mode and the user selects the tool controls 374 on the home screen, the user is able to configure profile data of the impact driver 104 using a control screen of the tool interface. For instance, via the control screen 380, the user is able to configure the current profile data of the temporary mode profile 300*e* of the impact driver 104. As illustrated, the user is able to adjust the starting speed via the speed text box 390 or the speed slider 391, adjust the finishing speed via the speed text box 392 or the speed slider 393, alter the rotations or impacts required to reduce speed via slider 394, adjust the work light duration with slider 395*a*, work light text box 395*b*, and "always on" toggle 395*c*, and adjust the work light intensity via the work light brightness options 396.

In some embodiments, the external device 108 and impact driver 104 enable real time or live updating of the temporary mode profile 300*e*. When updating in real time (hereinafter live updating), the temporary mode profile 300*e* of the impact driver 104 is updated as changes to the parameters are made on the control screen 380 without requiring a subsequent saving step or other actuation taken by the user on the GUI of the external device 108 or on the power tool. In other words, when live updating, the external device 108 updates the temporary mode profile 300*e* on the impact driver 104 in response to receiving a user input changing one of the parameters, rather than in response to a user input saving the temporary mode profile 300*e*. For instance, with respect to FIG. 8A, the starting speed of the impact driver 104 is set to 2900 revolutions per minute (RPM). When live updating, when a user slides the speed slider 391 to the left by dragging his/her finger across the speed slider 391 and then removes his/her finger from the touch screen display 332 of the external device 108 upon reaching a new speed, the external device 108 will transmit the newly selected starting speed to the impact driver 104 to update the temporary mode profile 300*e* when the user's finger is removed from the screen, without requiring a further depression of a button or other actuation by the user. Live updating is applicable to the other parameters on the control screen 380 as well, such as the rotations or impacts required to reduce speed and work light parameters. Live updating enables rapid customization of the power tool (e.g., impact driver 104) so that a user may test and adjust various profile parameters quickly with fewer key presses. In contrast to live updating, in some embodiments, after sliding the speed slider 391 to the new speed, the user must press a save button (e.g., save button 408 in FIG. 10) to effect the update of the starting speed parameter on the temporary mode profile 300*e*.

Figure 11:
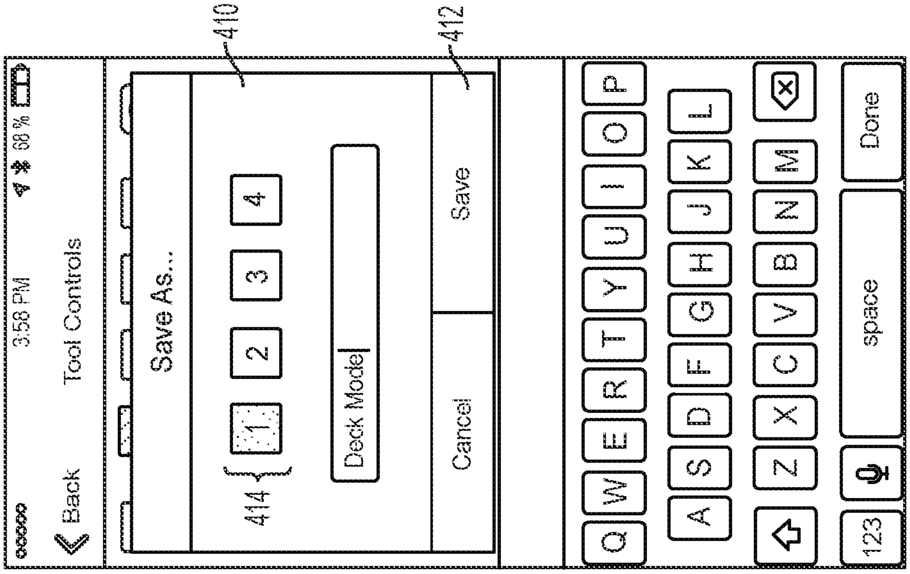

A user is also able to save a mode profile set via a control screen (e.g., the control screen 380) to the impact driver 104. More particularly, the user is able to overwrite one of the mode profiles 300*a-d* in the profile bank 302 with the mode profile as specified on a control screen. To save the mode profile generated by the user via the control screen 308, the user selects the save button 408. As shown in FIG. 11, pressing the save button causes the core application software to generate a save prompt 410 requesting the user to name the created mode profile and specify which of the mode profiles 300*a-d* to overwrite with the created mode profile by selecting one of the mode labels 414. In response to the user input (e.g., selecting one of the mode labels 414 and selecting the save button 412), the external device 108 sends the generated mode profile to the impact driver 104. The electronic processor 230 receives the generated mode profile and overwrites the mode profiles 300 in the profile bank 302 specified for overwriting by the user with the generated mode profile. For example, in FIG. 11, the user has named the generated mode profile "Deck Mode" and specified that the electronic processor 230 overwrite mode profile 300*a* (associated with mode "1") with the generated "Deck Mode" mode profile. In some embodiments, the user can elect to overwrite more than one mode profile 300*a-e* with the generated mode profile by selecting multiple of the mode labels 414 before selecting the save button 412. In some embodiments, the user can elect to not overwrite any of the mode profiles 300*a-e* with the generated mode profile by not selecting any of the mode labels 414 before selecting the save button 412. In such embodiments, the generated mode profile is saved in the profile bank 346 on the server 112, but not on the impact driver 104. Overwriting a profile (e.g., a previous profile) with another profile (e.g., a new profile) may include, for example, storing the new profile at the location in memory that was storing the previous profile, thereby erasing the previous profile and replacing it in memory with the new profile, or may include storing the new profile at another location in memory and updating a profile pointer to point to the address in memory having the new profile instead of the address in memory having the previous profile.

Figure 10:
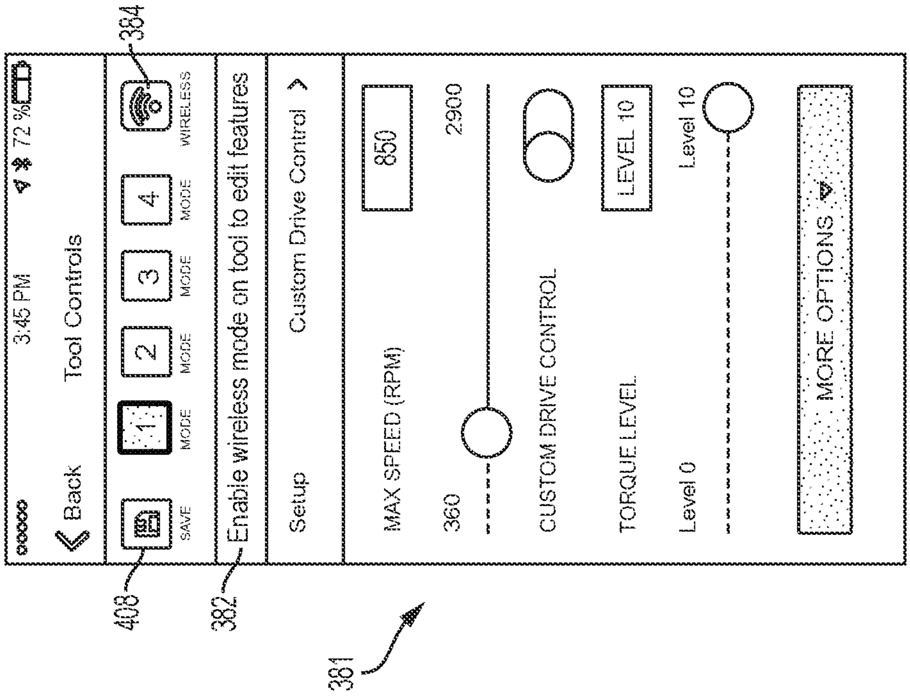

As noted above, in some embodiments, the external device 108 cannot overwrite data of the profiles 300 unless the impact driver 104 is in the adaptive mode (see FIG. 10). This aspect prevents a potentially malicious individual, separate from the user currently operating the impact driver 104, from adjusting tool parameters of the impact driver 104 unless the user places the impact driver 104 in the adaptive mode. Thus, a user of the impact driver 104 can prevent others from adjusting parameters by operating the impact driver 104 in one of the other four modes. In some embodiments, to implement this aspect, a hardware or firmware based interlock prevents the electronic processor 230 from writing to the profile bank 302 unless the impact driver 104 is in the adaptive mode. Furthermore, when the impact driver 104 is in operation, a hardware or firmware based interlock prevents the electronic processor 230 from writing to the profile bank 302. The electronic processor 230 may detect that the impact driver 104 is in operation based on depression of the trigger 212 or outputs from Hall sensors indicating motor spinning. Thus, even when the impact driver 104 is in the adaptive mode, if the impact driver 104 is currently operating, the electronic processor 230 will not update or write to the profile bank 302 even when the impact driver 104 is in the adaptive mode and the external device 108 communicates to the impact driver 104 a generated profile (e.g., in response to a user selecting the save button 408).

Furthermore, in some embodiments, the electronic processor 230 outputs to the external device 108, via the wireless communication controller 250, a signal indicative of whether the impact driver 104 is currently operating. In turn, the external device 108 provides an indication to the user, such as through at least one of the wireless symbol 384 changing color (e.g., to red) or flashing and displaying a message when the impact driver 104 is currently operating. Moreover, the ability to update parameters via a control screen is prevented, similar to the control screen 381 of FIG. 10, when the external device 108 receives an indication that the impact driver 104 is currently operating.

Returning to FIG. 7, selecting the factory reset 379 on the home screen 370 causes the external device 108 to obtain default mode profiles from the tool mode profiles 314 or from the tool profile bank 346 on the server 112, and provide the default profiles to the impact driver 104, which then overwrites the profile bank 302 with the default mode profiles.

The home screen 370 may be similar in look and feel for all, many, or several of the tool interfaces 318, although the icon 371 may be customized for the specific tool interface based on the specific power tool with which the external device 108 is paired. Further, the options listed below the icon may add an "obtain data" option that enables the user to select and obtain operational data from the tool for display on the external device 108 and/or sending to the server 112 for storage as part of the tool data 348. Additionally, in instances where a particular tool is not intended to be configured by the external device 108, the tool controls 374 and manage profiles 376 options may be not included on the home screen 370.

In some embodiments, an adaptive mode switch separate from the mode selection switch 290 is provided on the impact driver 104. For instance, LED 296*e* (FIG. 3A) may be a combined LED-pushbutton switch whereby, upon first pressing the combined LED-pushbutton switch, the impact driver 104 enters the adaptive mode and, upon a second pressing of the switch, the impact driver 104 returns to the mode that it was in before first pressing (e.g., mode 1). In this case, the mode selection switch 290 may cycle through modes 1-4, but not the adaptive mode. Furthermore, certain combinations of trigger pulls and/or placement of the forward/reverse selector 219 into a particular position (e.g., neutral) may cause the impact driver 104 to enter and exit the adaptive mode.

Returning to the concept of mode profiles (e.g., profiles 300), a mode profile 300 includes one or more parameters. For instance, returning to FIGS. 8A-B, the mode profile illustrated is the concrete anchor profile, which has the following parameters: starting speed, finishing speed, rotations or impacts required to reduce speed, and multiple work light parameters. The particular parameters available for customization on a control screen of the external device 108 varies based on mode profile type.

The control screens of the tool interfaces 318 place bounds on the values that a user can enter for a particular parameter. For instance, in FIG. 8A, the starting speed cannot be set above a first pre-defined threshold or below a second pre-defined threshold (e.g., cannot be set below a maximum threshold of 2900 RPM or below a minimum threshold of 360 RPM). The impact driver 104 further includes a boundary check module, e.g., in firmware stored on the memory 232 and executed by the electronic processor 230. At the time of receiving a new profile from the external device 108 for saving in the profile bank 302, the boundary check module confirms that each parameter of each feature is within maximum and minimum boundaries (or a threshold range) or is otherwise a valid value for the particular parameter. For instance, the boundary check module confirms that the starting speed set for the concrete anchor profile is within the range of the first pre-defined threshold and the second pre-defined threshold (e.g., 360 RPM to 2900 RPM). In some instances, the boundary check module confirms the parameter values of the features of the power tool's current profile are within acceptable boundaries upon each trigger pull. To carry out the boundary check, the firmware may include a list of parameters for each feature and the applicable maximum and minimum thresholds (or boundaries) stored in, for instance, a table, and the electronic processor 230 is operable to perform comparisons with the table data to determine whether the parameter values are within the acceptable boundaries. The boundary check module provides an additional layer of security to protect against maliciously generated or corrupted profiles, features, and parameter values.

Upon the boundary check module determining that a parameter value is outside of an acceptable range, the controller 226 is operable to output an alert message to the external device 108 that indicates the error (which may be displayed in text on the touch screen display 332), drive indicator(s) 220, one or more of the LEDs 296*a-e*, vibrate the motor, or a combination thereof.

On some control screens of the tool interfaces 318, a parameter assist block is provided. The parameter assist block includes work factor inputs that allow a user to specify details of the workpiece on which the power tool will operate (e.g., material type, thickness, and/or hardness), details on fasteners to be driven by the power tool (e.g., material type, screw length, screw diameter, screw type, and/or head type), and/or details on an output unit of the power tool (e.g., saw blade type, number of saw blade teeth, drill bit type, and/or drill bit length). For instance, the concrete anchor profile control screen 380 includes a parameter assist block 805, as shown in FIGS. 8A-B. The parameter assist block 805 includes work factor inputs that allow a user to specify an anchor type (e.g., wedge or drop-in), an anchor length, an anchor diameter, and concrete strength (e.g., in pounds per square inch (PSI)). For instance, by selecting the parameter assist block 805, a parameter assist screen is generated on which the user can specify each of the work factor inputs by cycling through values using the touch screen display 332. Upon completing entry of the work factor inputs, the external device 108 adjusts parameters of the profile. For instance, in FIGS. 8A and 8B, the values of the starting speed parameter, finishing speed parameter, and rotations (or impacts, in various embodiments) required to reduce speed parameter are adjusted by the external device 108 based on the work factor inputs of the parameter assist block 805. If desired, the user may be able to further adjust some or all of the parameters (e.g., using a slider on the GUI as shown in FIGS. 8A and 8B). Different parameter assist blocks are provided for different profile types, and each parameter assist block may include work factor inputs appropriate to the particular profile type. Furthermore, one or more boundary (or threshold) values of the parameters on the control screen 380 may be adjusted by the external device 108 based on the work factor inputs of the parameter assist block 805. For example, the maximum speed selectable by the user for the starting speed parameter may be adjusted based on the concrete strength input of the parameter assist block 805.

As shown in FIG. 8A, the parameters of the concrete anchor profile include two user adjustable parameters of the same parameter type (motor speed) that are applicable at different stages (or zones) of a single tool operation (fastening). For example, for the concrete anchor profile, the control screen 380 is operable to receive user selections specifying a starting motor speed during the starting stage and driving stage of a fastening operation and a finishing speed during a final/finishing stage of the fastening operation. The controller 226 determines when the different stages of the fastening operation occur and are transitioned between as will be explained in greater detail below. In some embodiments, in the various stages of the concrete anchor profile, the controller 226 drives the motor 214 at the user-selected speeds regardless of the amount depression of the trigger 212, as long as the trigger 212 is at least partially depressed. In other words, according to various embodiments, the speed of the motor 214 does not vary based on the amount of depression of the trigger 212. In other embodiments, the user-selected speeds in the concrete anchor profile are treated as maximum speed values. Accordingly, in these embodiments, the speed of the motor 214 varies based on the amount of depression of the trigger 212, but the controller 226 ensures that the motor 214 does not exceed the user-selected speeds for the various stages.

The concrete anchor profile can be implemented on the impact driver 104 for use during masonry applications, such as when using the impact driver 104 to drive an anchor into concrete. Use of the concrete anchor profile can improve repeatability from one concrete anchor to the next, and reduce breaking of anchors caused by applying too much torque or driving with too much speed (e.g., by detecting when anchors are seated within a joint). Unlike some other driving applications, when driving into concrete, the impact driver 104 may begin impacting almost immediately. Accordingly, whether an anchor is seated within a joint cannot be determined by solely detecting when the impact driver 104 begins impacting (i.e., because the impact driver 104 may be impacting during the entire operation). The concrete anchor profile allows the controller 226 to detect when anchors are seated within a joint and, in response, reduce the motor speed to the finishing speed.

In particular, when operating in the concrete anchor profile, the controller 226 can initially control the motor 214 to operate at a starting speed set by the user. The controller 226 then monitors characteristics of the rotation of the motor 214 and determines whether impacts are occurring on the impact driver 104, as will be explained in greater detail below. After a certain motor rotation characteristic is detected, the controller 226 controls the motor 214 to operate at a slower speed (i.e., a finishing speed). In some embodiments, the external device 108 restricts the finishing speed to be less than the starting speed. For example, when the starting speed is set to 2000 RPM on the control screen 380*a*, the external device 108 may prevent the finishing speed from being set to a value of 2000 RPM or above.

The controller 226 adjusts the speed of the motor 214 based on an angle detection method that calculates an inferred position or inferred motion of the output drive device 210. For example, the controller 226 detects when impacts occur on the impact driver 104 based on, for example, detecting a change in acceleration, a velocity, an amount of instantaneous current or a change in current, impact sounds using a microphone, impact vibrations using an accelerometer, or impacts using a motion sensor (e.g., a gyroscope). The controller 226 may use an impact counter (for example, implemented by execution of software on the memory 232) that the controller 226 increments upon each detected impact. In some embodiments, the controller 226 uses the Hall sensors 218*a* to monitor the position of the shaft of the motor 214 including the rotational or translational position of the shaft when each impact occurs. In some embodiments, the controller 226 uses the anvil position sensor 218*c* to monitor the rotational or translational position of the drive device 210. The motion information (velocity, acceleration) may be determined directly (e.g., when a motion sensor is included) or indirectly (e.g., based on position when a position sensor is included).

Figure 12A:
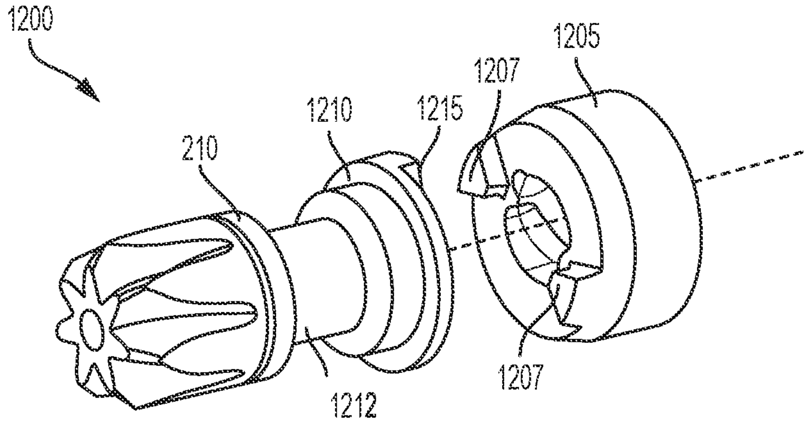
FIGS. 12A and 12B illustrate an impact mechanism of an impact driver according to one embodiment.
Figure 12B:
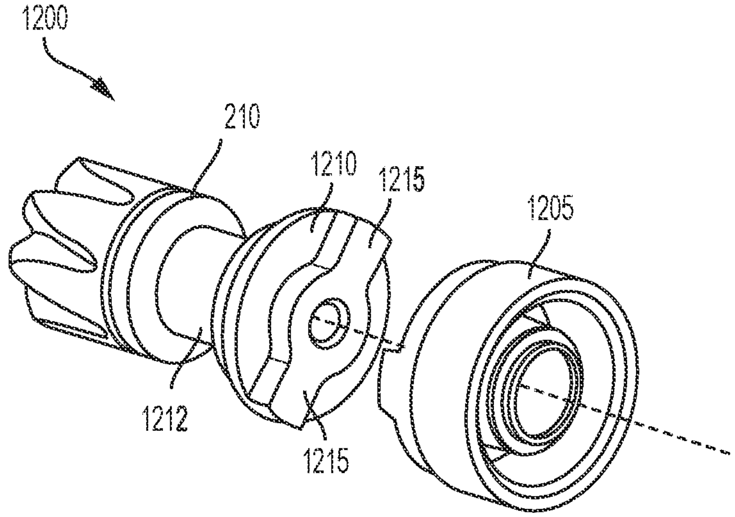

FIGS. 12A and 12B show an impact mechanism 1200, which is an example of an impact mechanism of the impact driver 104. Based on the design of the impact mechanism 1200 of the impact driver 104, the motor 214 rotates at least a predetermined number of degrees between impacts (i.e., 180 degrees for the impact mechanism 1200). The impact mechanism 1200 includes a hammer 1205 with outwardly extending lugs 1207 and an anvil 1210 with outwardly extending lugs 1215. The anvil 1210 is coupled to the output drive device 210 via a shaft 1212. In some embodiments, the output drive device 210 includes a gearbox output for interfacing with a gearbox to drive another output shaft. FIGS. 12A and 12B illustrate a helical bevel gearbox output, however, other types of gearbox outputs may be used, such as a straight bevel, a spiral bevel, or the like. In some embodiments, the gearbox output is omitted and the output drive device 210 directly interfaces with a workpiece. For example, the output drive device 210 may be a socket as shown in FIG. 2, a chuck, or some other suitable type of workpiece interface. During operation, impacting occurs when the anvil 1210 encounters a certain amount of resistance, e.g., when driving a fastener into a workpiece. When this resistance is met, the hammer 1205 continues to rotate. A spring coupled to the back-side of the hammer 1205 causes the hammer 1205 to disengage the anvil 1210 by axially retreating. Once disengaged, the hammer 1205 will advance both axially and rotationally to again engage (i.e., impact) the anvil 1210. When the impact mechanism 1200 is operated, the hammer lugs 1207 impact the anvil lugs 1215 every 180 degrees. Accordingly, when the impact driver 104 is impacting, the hammer 1205 rotates 180 degrees without the anvil 1210, impacts the anvil 1210, and then rotates with the anvil 1210 a certain amount before repeating this process. For further reference on the functionality of the impact mechanism 1200, see, for instance, the impact mechanism discussed in U.S. application Ser. No. 14/210,812, filed Mar. 14, 2014, which is herein incorporated by reference in its entirety. Although two hammer lugs 1207 that impact the anvil lugs 1215 every 180 degrees are shown, more than two hammer lugs 1207 could be used, which would change the degrees of separation (e.g., three hammer lugs that impact the anvil lugs 1215 every 120 degrees), according to various embodiments.

The controller 226 can determine how far the hammer 1205 and the anvil 1210 rotated together by monitoring the angle of rotation of the shaft of the motor 214 between impacts using the Hall sensors 218*a* or by monitoring the anvil position using the anvil position sensor 218*c*. For example, when the impact driver 104 is driving an anchor into a softer joint, the hammer 1205 may rotate 225 degrees between impacts. In this example of 225 degrees, 45 degrees of the rotation includes hammer 1205 and anvil 1210 engaged with each other and 180 degrees includes just the hammer 1205 rotating before the hammer lugs 1207 impact the anvil 1210 again. FIGS. 13-16 illustrate this exemplary rotation of the hammer 1205 and the anvil 1210 at different stages of operation.

Figure 13A:
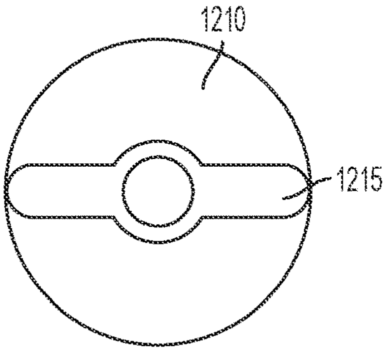
FIGS. 13A, 13B, 14A, 14B, 15A, 15B, 16A, and 16B illustrate an exemplary operation of a hammer and an anvil of the impact driver according to one embodiment.
Figure 13B:
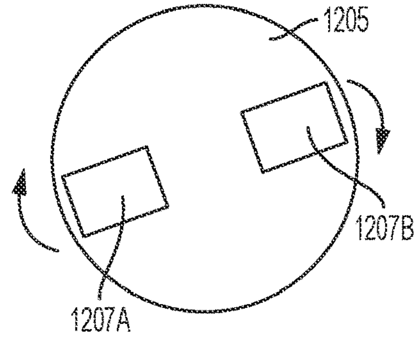
Figure 14A:
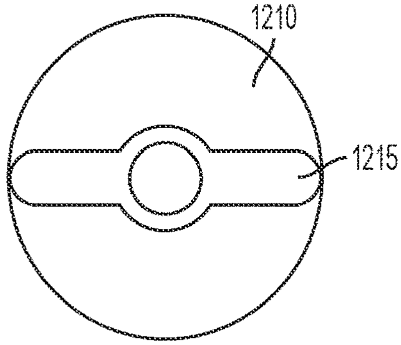
Figure 14B:
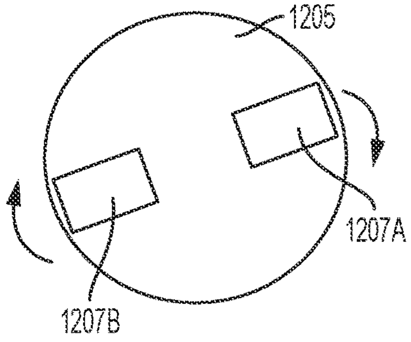

FIGS. 13A and 13B show the rotational positions of the anvil 1210 and the hammer 1205, respectively, at a first timing (e.g., just after the hammer lugs 1207A, 1207B disengage the lugs 125 of the anvil 1210 (i.e., after an impact and engaged rotation by both the hammer 1205 and the anvil 1210 has occurred)). FIG. 13A show a first rotational anvil position of the anvil 1210 at the first timing. FIG. 13B shows a first rotational hammer position of the hammer 1205 at the first timing (e.g., just as the hammer lugs 1207A and 1207B being to axially retreat from the anvil 1210. After the hammer 1205 disengages the anvil 1210 by axially retreating, the hammer 1205 continues to rotate (as indicated by the arrows in FIG. 13B) while the anvil 1210 remains in the first rotational anvil position. FIGS. 14A and 14B show the rotational positions of the anvil 1210 and the hammer 1205, respectively, at a second timing (e.g., at a first moment of impact). As shown in FIG. 14A, the anvil 1210 remains in the first rotational anvil position at the second timing. As shown in FIG. 14B, the hammer 1205 has rotated 180 degrees to a second rotational hammer position (as indicated by the arrows in FIG. 14B, and the change of positions of hammer lugs 1207A and 1207B from FIG. 13B to FIG. 14B).

Figure 15A:
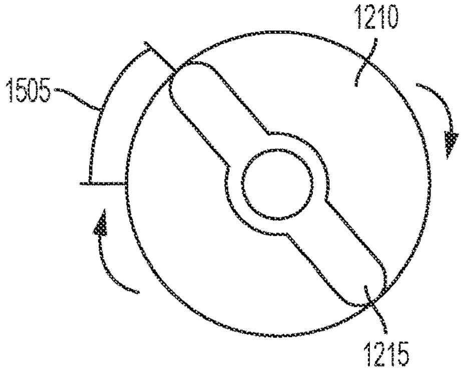
Figure 15B:
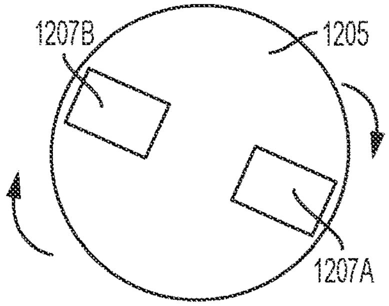

Upon impact between the hammer lugs 1207A and 1207B and the anvil lugs 1215, the hammer 1205 and the anvil 1210 rotate together in the same rotational direction (as indicated by the arrows in FIGS. 15A and 15B) which generates torque that is provided to the output drive device 210 to drive an anchor into concrete, for example. FIGS. 15A and 15B show the rotational positions of the anvil 1210 and the hammer 1205, respectively, at a third timing (e.g., after the hammer 1205 again disengages the anvil 1210 by axially retreating). As an example, in FIGS. 15A and 15B, at a third timing, the hammer 1205 is in a third rotational hammer position and the anvil 1210 is in a second rotational anvil position that is approximately 45 degrees from the first rotational anvil position as indicated by drive angle 1505. The drive angle 1505 indicates the number of degrees that the anvil 1210 rotated between events (e.g., between non-movement periods or between impacts) which corresponds to the number of degrees that the output drive device 210 rotated between events.

Figure 16A:
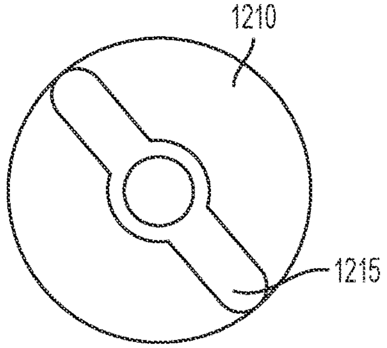
Figure 16B:
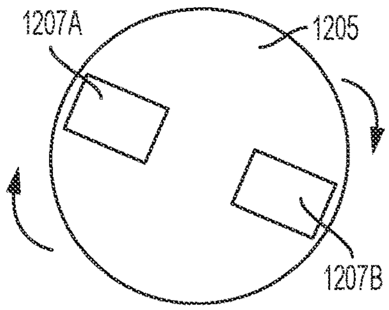

As stated above, after the hammer 1205 disengages the anvil 1210, the hammer 1205 continues to rotate (as indicated by the arrows in FIG. 16B) while the anvil 1210 remains in the same rotational position. FIGS. 16A and 16B show the rotational positions of the anvil 1210 and the hammer 1205, respectively, at a further timing (e.g., a second moment of impact is occurring). As shown in FIG. 16A, the anvil 1210 remains in the second rotational anvil position at the fourth timing. As shown in FIG. 16B, the hammer 1205 has rotated 180 degrees from the third rotational hammer position to a fourth rotational hammer position. Relative to FIG. 14B (i.e., the first timing (e.g., when the first movement of impact occurred)), the hammer 1205 has rotated 225 degrees (i.e., 45 degrees while engaged with the anvil 1210 after the previous impact and 180 degrees after disengaging from the anvil 1210). Although specific degrees of rotation are used for exemplary purposes above, it can be appreciated that the specific degrees of rotation may vary. In addition, although rotational positions are used as an example, other information indicating impacts may be used instead of or in combination with rotational positions, such as motion information (velocity, acceleration) based on motion sensor output, or translational information based on forward/backward movement of a shaft or other component.

As mentioned previously, the controller 226 may monitor when impacts occur and may monitor the position of the shaft of the motor 214. Using this information, the controller 226 may determine the drive angle 1505 experienced by the output drive device 210 (i.e., the number of degrees that the output drive device 210 has rotated). For example, the controller 226 may detect when each impact occurs and record the rotational or translational position of shaft. The controller 226 can then determine the number of degrees that the shaft rotated between impacts. The controller 226 can subtract 180 degrees from the number of degrees that the shaft rotated to calculate the drive angle 1505 experienced by the output drive device 210.

The calculated drive angle 1505 can then be used to indicate a characteristic of the joint that the anchor is being driven into and to control the motor 214. For example, the smaller the drive angle 1505, the harder the joint (i.e., the anchor rotates less in harder joints than in softer joints), and vice versa. Thus, a small drive angle (e.g., less than 10 degrees) may indicate that the anchor is seated and no longer needs to be driven into the concrete. Accordingly, when the drive angle 1505 is below a predetermined angle threshold (e.g., 10 degrees) for more than a predetermined number of impacts, the controller 226 may control the motor 214 to run at a slower speed or may turn off the motor 214.

As mentioned previously and as shown in FIGS. 8A and 8B on the control screen 380 of the GUI, the concrete anchor profile includes a parameter assist block 805 for receiving, from the user, one or more of an anchor type (e.g., wedge or drop-in), an anchor length, an anchor diameter, and concrete strength (e.g., in pounds per square inch (PSI)). In response to the external device 108 receiving user inputs in the parameter assist block 805, the external device 108 adjusts parameters of the concrete anchor profile (e.g., starting speed, finishing speed, number of rotations or impacts required to reduce speed to finishing speed). The external device 108 may adjust the parameters using a look-up table that includes parameter values corresponding to the user inputs in the parameter assist block 805. If desired, the user is able to further adjust each parameter as previously explained (e.g., using a slider on the GUI as shown in FIGS. 8A and 8B). Additionally, the user can adjust the work light parameters on the control screen 380*b* as previously explained.

In some embodiments, the maximum starting speed selectable by the user on the control screen 380 of FIG. 8A (e.g., 2900 RPM) is determined based on the ability of the controller 226 to detect impacts. For example, at high speeds, the controller 226 may not be able to detect when impacts are occurring because the change in motor acceleration caused by impacts is not large enough to be recognized. Thus, the maximum starting speed selectable by the user may be set sufficiently low such that the controller 226 is still able to detect impacts even if the user selects the maximum starting speed displayed on the control screen 380.

Furthermore, in various embodiments, the finishing speed is not adjustable by the user. Rather, the finishing speed is set by the external device 108 based on the work factor inputs of the parameter assist block 805. Additionally, the external device 108 may determine a drive angle threshold parameter based on the user inputs in the parameter assist block 805. When the drive angle is below the drive angle threshold, the controller 226 may begin counting impacts as explained in more detail below. The impact driver 104 receives the concrete anchor profile including the specified parameters, for instance, in response to a user save action on the external device 108 as described above.

Figure 17:
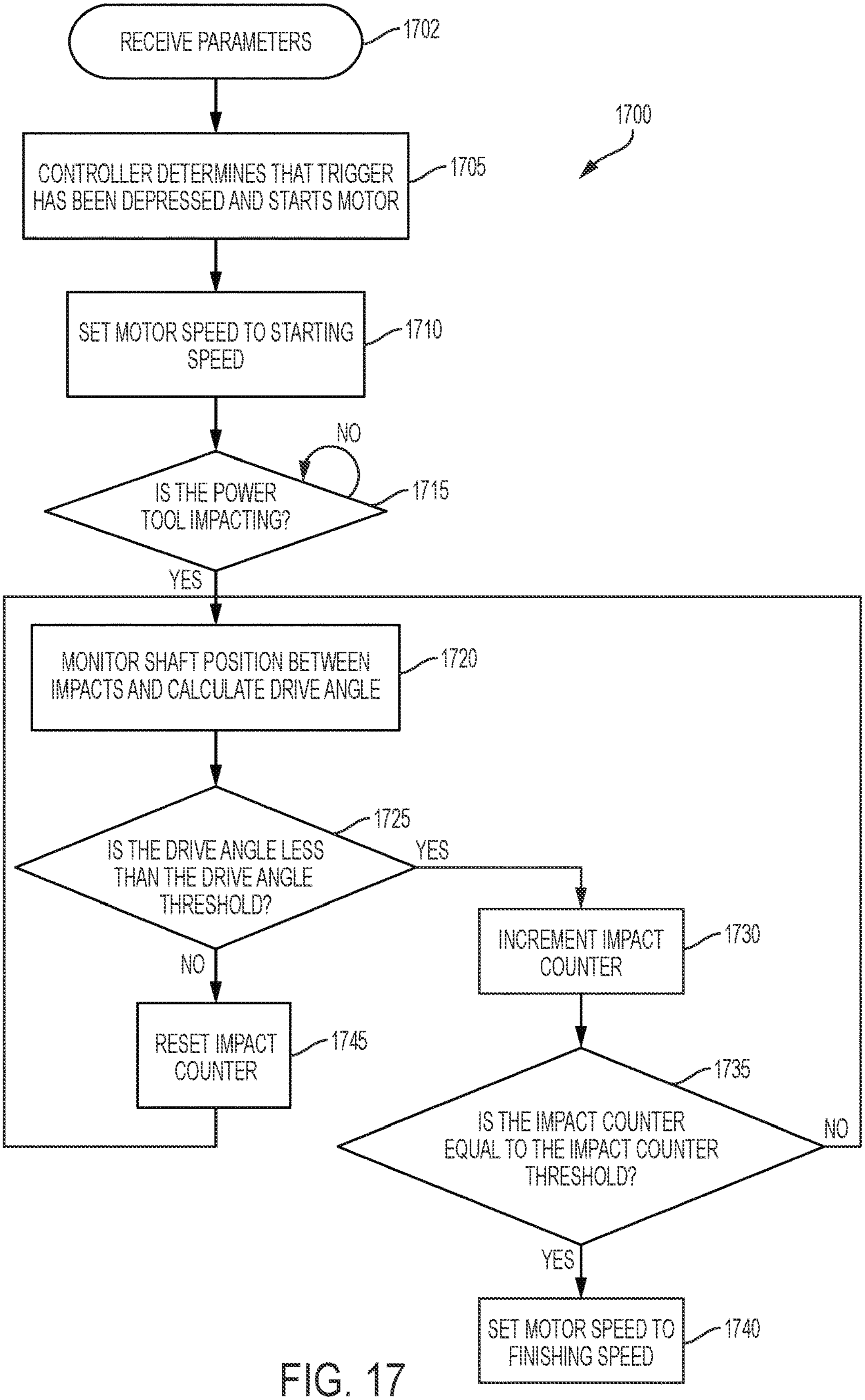
FIG. 17 illustrates a flow chart of a first exemplary implementation for controlling the power tool.

FIG. 17 illustrates a flowchart of a method 1700 of implementing the concrete anchor profile on the impact driver 104. At block 1702, the wireless communication controller 250 receives parameters of the concrete anchor profile from the external device 108. For example, the parameters are received as part of a concrete anchor profile configured and provided as described previously herein, for example, with respect to FIGS. 8A-B. At block 1705, the controller 226 determines that the trigger 212 has been depressed and starts the motor 214, as described previously herein. At block 1710, the controller 226 sets the motor speed to the starting speed (i.e., a first speed) (or sets the motor speed according to the amount that the trigger 212 is depressed with the maximum speed set as the starting speed as described previously herein). At block 1715, the controller 226 monitors motor characteristics to determine whether the impact driver 104 is impacting, as described previously herein. When the impact driver 104 is not impacting, the method 1700 remains at block 1715 and the controller 226 continues to monitor motor characteristics to determine whether the impact driver 104 is impacting. That is, the method 1700 may loop at block 1715 until the impact tool is impacting. When the controller 226 determines that the impact driver 104 is impacting, at block 1720, the controller 226 calculates the drive angle 1505 experienced by the output drive device 210 as explained previously herein (e.g., by monitoring the rotational position of the shaft each time an impact is detected). For example, the controller 226 may calculate the drive angle 1505 by determining a first rotational motor shaft position of the motor shaft upon a first impact between the hammer 1205 and the anvil 1210 (see, e.g., the second rotational hammer position of the hammer 1205 in FIG. 14B), and determining a second rotational motor shaft position of the motor shaft upon a second impact between the hammer 1205 and the anvil 1210 (see, e.g., the fourth rotational hammer position of the hammer 1205 in FIG. 16B). The controller 226 may then determine the drive angle experienced by the output drive device based on the first rotational motor shaft position and the second rotational motor shaft position of the motor shaft. For example, the controller 226 may determine a difference between the second rotational motor shaft position and the first rotational motor shaft position, and subtract a predetermined angle. The predetermined angle may be indicative of an amount of rotation experienced by the hammer 1205 during a period of time (e.g., between impacts, or a period of time from disengaging the anvil 1210 to impacting the anvil 1210). For example, with reference to the impact mechanism 1200 illustrated in FIGS. 12A and 12B and described with respect to FIGS. 13A-16B, the predetermined angle may be 180 degrees. However, the amount of rotation experienced by a hammer from disengaging an anvil to impacting the anvil (and, thus, the predetermined angle) varies depending on the arrangement of the impact mechanism, such as the number of and position of the lugs on the hammer and anvil of a given impact mechanism. For example, when a hammer includes four lugs each separated by 90 degrees, rather than two lugs separated by 180 degrees, and operates with the anvil 1210, the hammer experiences 90 degrees of rotation from disengaging the anvil to impacting the anvil, rather than 180 degrees of rotation. In this example, the predetermined angle is 90 degrees. Various numbers of lugs may be used in the hammer and anvil, respectively, and two and four lugs for the hammer and two lugs for the anvil are only used as examples. In addition, translational position may be used instead of or in combination with the rotational positions, and the rotational positions are only used as examples.

At block 1725, the controller 226 determines whether the drive angle 1505 is less than the drive angle threshold. When the drive angle 1505 is less than the drive angle threshold, at block 1730, the controller 226 increments an impact counter (e.g., implemented by the controller 226 executing software stored on the memory 232). At block 1735, the controller 226 determines whether the impact counter is equal to the number of impacts (an "impact counter threshold") set to indicate when the motor 214 is to reduce speed. When the impact counter is not equal to the impact counter threshold, the method 1700 proceeds back to block 1720 to continue calculating the drive angle 1505 between impacts. When the impact counter is equal to the impact counter threshold, the controller 226 sets the motor speed to the finishing speed. Referring back to block 1725, when the drive angle 1505 is greater than or equal to the drive angle threshold, the method 1700 proceeds to block 1745. At block 1745, the controller 226 resets the impact counter and then proceeds back to block 1720 to continue calculating the drive angle 1505 between impacts. In alternate embodiments, the block 1745 may not be executed such that the impact counter is not reset when the controller 226 determines that the drive angle 1505 is not less than the drive angle threshold at block 1725. In such embodiments, the method 1700 remains at block 1725 until the drive angle 1505 is determined to be less than the drive angle threshold.

Although the blocks of the method 1700 are illustrated serially and in a particular order in FIG. 17, in some embodiments, one or more of the blocks are implemented in parallel, are implemented in a different order than shown, or are bypassed. In some embodiments, the impact driver 104 receives and stores the concrete anchor profile including the parameters (block 1702) at the time of manufacture of the tool. In some embodiments, the parameters received in block 1702 at the time of manufacture of the tool are received via a wired connection. Additionally, blocks 1725, 1730, 1735, 1740, and 1745 are an example of the controller 226 controlling the motor 214 based on the drive angle determined in block 1720.

Figure 18:
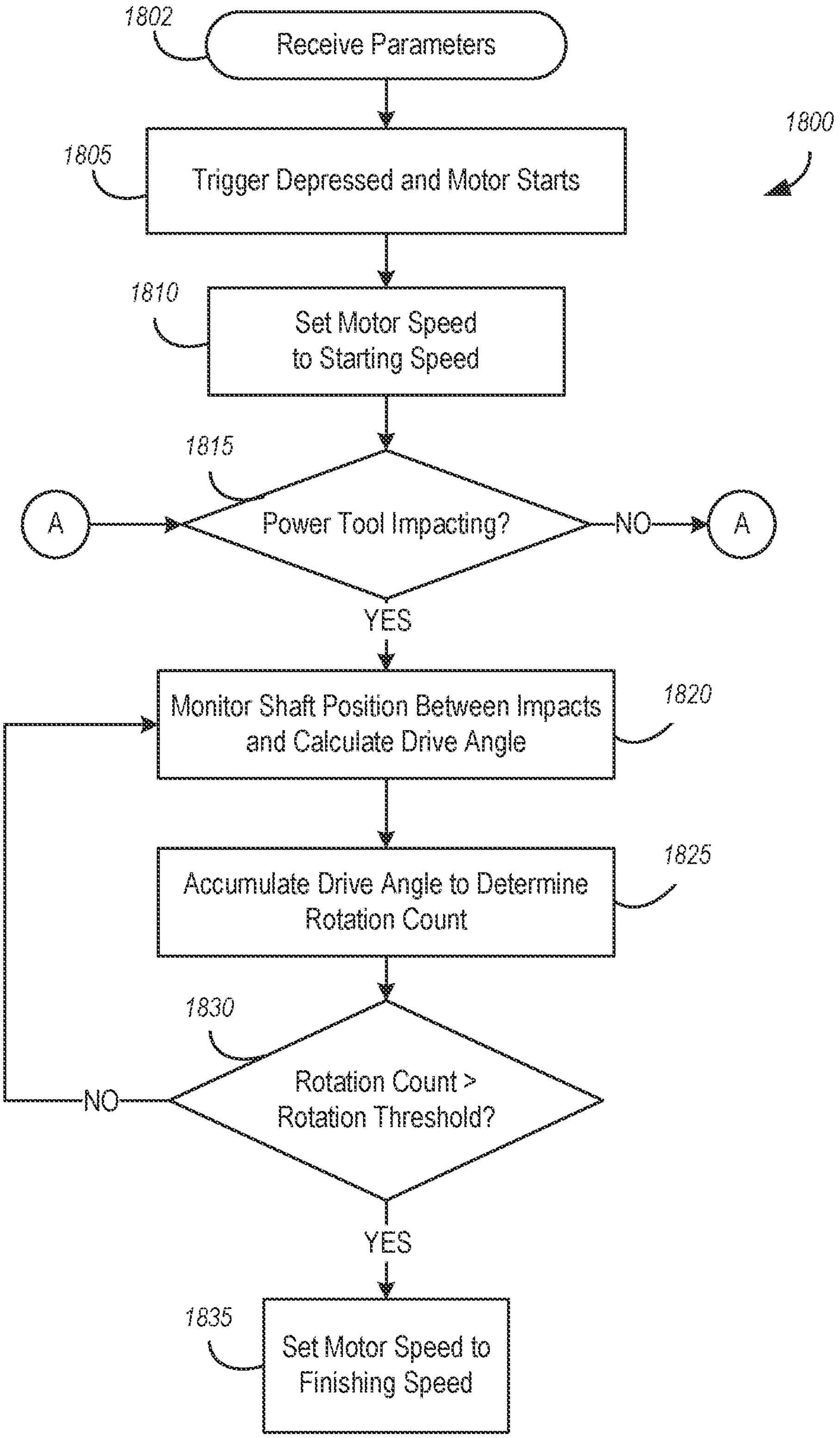
FIG. 18 illustrates a flow chart of a second exemplary implementation for controlling the power tool.

FIG. 18 illustrates a flowchart of a method 1800 of implementing control of the impact driver 104. At block 1802, the wireless communication controller 250 receives parameters of a control profile from the external device 108. For example, at block 1802, the parameters are received as part of a concrete anchor profile configured and provided as described previously herein, for example, with respect to FIGS. 8A-B. In some embodiments, the parameters include a total number of rotations associated with a transition from a motor starting speed to a motor finishing speed.

At block 1805, the controller 226 determines that the trigger 212 has been depressed and starts the motor 214, as described previously herein. At block 1810, the controller 226 sets the motor speed to a first speed (e.g., a starting speed) (or sets the motor speed according to the amount that the trigger 212 is depressed with the maximum speed set as the starting speed as described previously herein). At block 1815, the controller 226 monitors motor characteristics to determine whether the impact driver 104 is impacting, as described previously herein. When the impact driver 104 is not impacting, the method 1800 remains at block 1815 and the controller 226 continues to monitor motor characteristics to determine whether the impact driver 104 is impacting.

According to various embodiments, block 1815 may include a different methodology instead of detecting impacts to determine whether a bolt is snug tight. For example, it is not uncommon for a fastener or bolt to start impacting early (e.g., due to a burr or poor machining). Thus, according to various embodiments, an angular rate of change per impact over multiple impacts may be detected based on monitoring the anvil rotation. According to various embodiments, another alternative approach is estimating the anvil rotation from the forwards rotation of the motor per each impact and optionally compensating for hammer movement along the camshaft. Other parameters (e.g., hammer motion, hammer energy) may also be used, according to various embodiments. According to various embodiment, a neural network (machine learning model) may be used to detect a bolt being snug tight. For example, a is to use a machine learning model. A recurrent neural network (RNN), a convolutional neural network (CNN), or a deep neural network (DNN) of impact sensor input as described in PCT Patent Application Publication No. WO2021/016437, filed Jul. 23, 2020, the entire content of which is hereby incorporated by reference, may classify when a fastener becomes seated. After the determination of a fastener becoming seated, the angular rotation may be used for further processing as described herein.

When the controller 226 determines that the impact driver 104 is impacting, at block 1820, the controller 226 calculates the drive angle 1505 experienced by the output drive device 210 as explained previously herein (e.g., by monitoring the rotational position of the anvil each time an impact is detected). For example, the controller 226 may calculate the drive angle 1505 by determining a first rotational anvil position of the anvil upon a first impact between the hammer 1205 and the anvil 1210 (see, e.g., the rotational position of hammer 1205 in FIG. 14B), and determining a second rotational anvil position of the anvil upon a second impact between the hammer 1205 and the anvil 1210 (see, e.g., the rotational position of hammer 1205 in FIG. 16B). The controller 226 may then determine the drive angle experienced by the output drive device based on the first rotational anvil position and the second rotational anvil position. For example, the controller 226 may determine a difference between the second rotational anvil position and the first rotational anvil position, and subtract a predetermined angle. Although first and second rotational anvil positions are used, hammer positions may be used instead, according to various embodiments. The predetermined angle may be indicative of an amount of rotation experienced by the hammer 1205 from disengaging the anvil 1210 to impacting the anvil 1210. For example, with reference to the impact mechanism 1200 illustrated in FIGS. 12A and 12B and described with respect to FIGS. 13A-16B, the predetermined angle may be 180 degrees. However, the amount of rotation experienced by a hammer from disengaging an anvil to impacting the anvil (and, thus, the predetermined angle) varies depending on the arrangement of the impact mechanism, such as the number of and position of the lugs on the hammer and anvil of a given impact mechanism. For example, when a hammer includes four lugs each separated by 90 degrees, rather than two lugs separated by 180 degrees, and operates with the anvil 1210, the hammer experiences 90 degrees of rotation from disengaging the anvil to impacting the anvil, rather than 180 degrees of rotation. In this example, the predetermined angle is 90 degrees. As previously discussed above, the number of lugs is not limited, and the specific values are used merely as examples.

At block 1825, the controller 226 accumulates the drive angle to determine a rotation count, for example, as measured from when the trigger was depressed. At block 1830, the controller 226 determines whether the rotation count is greater than a rotation threshold. For example, when the sum of the accumulated rotation count and the drive angle exceeds the rotation threshold, the condition of block 1830 is satisfied. Either or both of the rotation count or the rotation threshold may include integer values or may be other values (e.g., fractional values). When the rotation count is not greater than the rotation threshold, the method 1800 loops back to block 1820 to continue calculating the drive angle 1505 between impacts. When the rotation count exceeds the rotation threshold, the controller 226 sets the motor speed to a second speed (e.g., finishing speed) at block 1835. In some embodiments, the finishing speed may be set to zero in the profile to effectuate stopping of the motor 214 when the predetermined number of rotations is met. Although a motion count is accumulated, a translational count (e.g., based on forward/backward movement) or a motion count (e.g., corresponding to an impact) could be used and a rotation count is merely used as an example.

Although the blocks of the method 1800 are illustrated serially and in a particular order in FIG. 18, in some embodiments, one or more of the blocks are implemented in parallel, are implemented in a different order than shown, or are bypassed. In some embodiments, the impact driver 104 receives and stores a control profile including the parameters (block 1802) at the time of manufacture of the tool. In some embodiments, the parameters received in block 1802 at the time of manufacture of the tool are received via a wired connection. Additionally, blocks 1825, 1830, and 1835 are an example of the controller 226 controlling the motor 214 based on the drive angle determined in block 1820.

In the example of FIG. 18, the controller 226 uses the accumulated rotation count to determine when to reduce the motor speed to the finishing speed. The use of the rotation count may be employed in place of or in combination with the number of impacts below the drive angle threshold approach described in FIG. 17. For example, in some embodiments, the controller 226 reduces the motor speed to the finishing speed responsive to the rotation count or responsive to the drive angle threshold.

The methods 1700, 1800 can also be implemented for other fastening applications. For example, the methods 1700, 1800 can be implemented on an impact driver or wrench used to fasten a screw or other fastener into wood, drywall, or another substrate. For some fasteners and bolts, the accumulated angle needed to achieve a given torque, tension, or other criteria may vary from one fastener (or material) to another. As such, the accumulated angle may be one of multiple factors that go into the control logic for shutting down, see, for instance, the control logic discussed in PCT Publication No. WO2021/016437, the entire content of which was previously incorporated by reference.

FIGS. 19-28 illustrate the anvil position sensor 218*c* of the power tool 102 and various relief features 1213*a*-1213*l* formed on the shaft 1212 of the anvil 1210. A relief feature 1213*a*-1213*l* is a feature that is either raised or recessed with respect to the diameter of the shaft 1212. The relief features 1213*a*-1213*l* have a profile that varies with the rotational position of the shaft. The relief features 1213*a*-1213*l* cooperate with the anvil position sensor 218*c* to facilitate anvil position measurement by affecting a magnetic field generated by the anvil position sensor 218*c*. Since the relief features 1213*a*-1213*l* have a profile that varies with the rotational position of the shaft 1212, the effect on the magnetic field also varies with the rotational position of the shaft 1212.

In some embodiments, the anvil position sensor 218*c* is a triggered inductive sensor that includes a transmitting circuit trace and one or more receiving circuit traces. The anvil position sensor 218*c* injects a current into the transmitting circuit trace to generate a magnetic field. The magnetic field interacts with the relief features 1213*a*-1213*l* on the shaft 1212 of the anvil 1210 that vary with rotational position. Eddy currents are generated in the anvil shaft 1212 and relief features 1213*a*-1213*l*. The eddy currents generate a magnetic field that passes across the one or more receiving circuit traces and generates an output that varies with rotational position. Current induced in the one or more receiving circuit traces is used by the anvil position sensor 218*c* to determine the position of the anvil 1210. In some embodiments, the anvil position sensor 218*c* is an inductance-to-digital converter (LDC) implemented using an inductive sensor that includes a sensor capacitor in parallel with a transmitting circuit trace. The magnetic field is affected by the relief features 1213*a*-1213*g* on the shaft 1212 of the anvil 1210. In some embodiments, the voltage on the sensor capacitor varies as a function of the rotational position of the anvil 1210. In some embodiments, the resonant frequency of the sensor capacitor and the transmitting circuit trace varies as a function of the rotational position of the anvil 1210.

Figure 19:
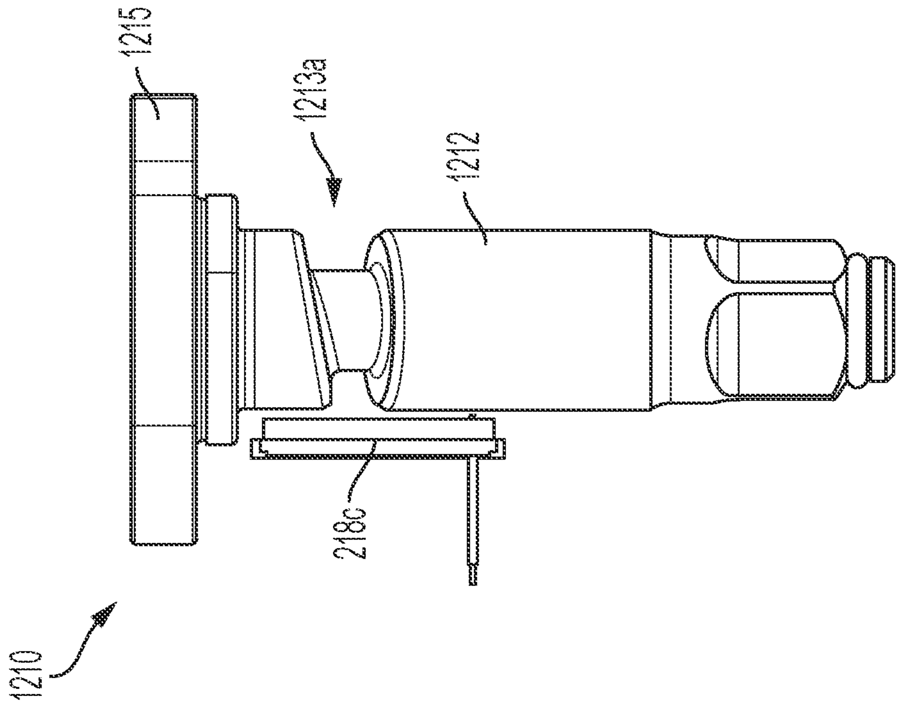
FIG. 19 illustrates an anvil position sensor and a recessed relief feature of the power tool.

FIG. 19 illustrates the anvil position sensor 218*c* and a recessed relief feature 1213*a* of the power tool 102. In some embodiments, the shaft 1212 is machined to form the recessed relief feature 1213*a*. In general, the profile of the recessed relief feature 1213*a* varies with the rotational position of the shaft 1212. As illustrated in FIG. 19, the recessed relief feature 1213*a* has a width that varies with rotational position. A transmitting current produces a magnetic field by the anvil position sensor 218*c* and generates eddy currents in the shaft 1212 that are affected by the profile of the recessed relief feature 1213*a* at the particular rotational position of the shaft 1212. In some embodiments, the spacing between the anvil position sensor 218*c* and the shaft 1212 is between about 0.5-1.3 mm.

Figure 20:
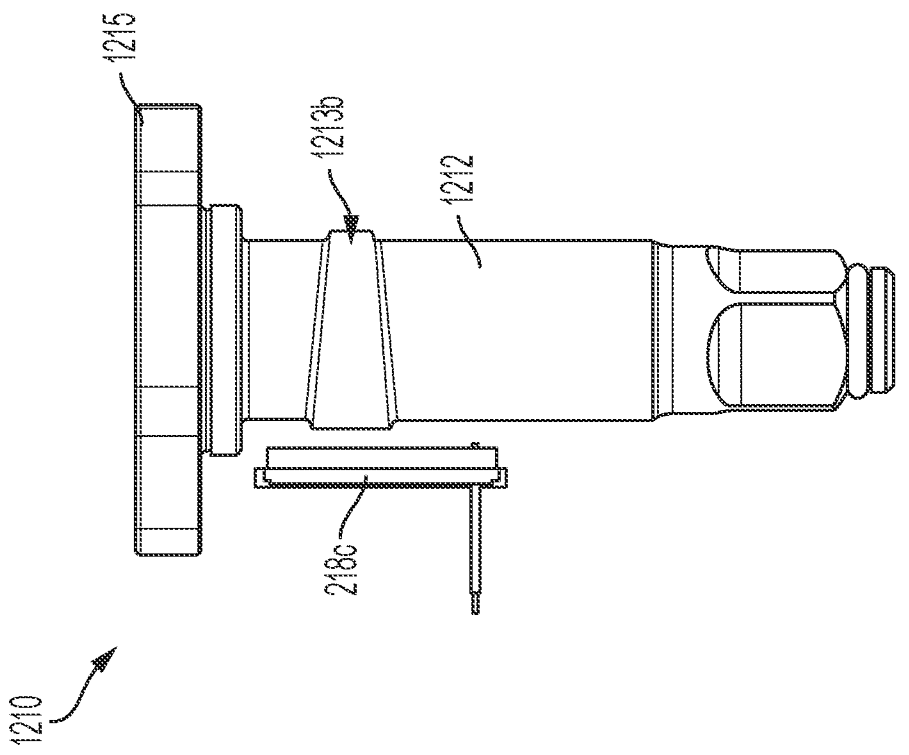
FIG. 20 illustrates an anvil position sensor and a raised relief feature of the power tool.

FIG. 20 illustrates an anvil position sensor 218*c* and a raised relief feature 1213*b* of the power tool 102. In some embodiments, the shaft 1212 is machined to form the raised relief feature 1213*b* to protrude from a rotational surface of the shaft 1212. In general, the profile of the raised relief feature 1213*b* varies with the rotational position of the shaft 1212. As illustrated in FIG. 20, the recessed relief feature 1213*a* has a width that varies with rotational position. The transmitting current produces a magnetic field by the anvil position sensor 218*c* and generates eddy currents in the shaft 1212 that are affected by the profile of the raised relief feature 1213*b* at the particular rotational position of the shaft 1212. In some embodiments, the spacing between the anvil position sensor 218*c* and the raised relief feature 1213*b* is between about 0.5-1.3 mm.

Figure 21:
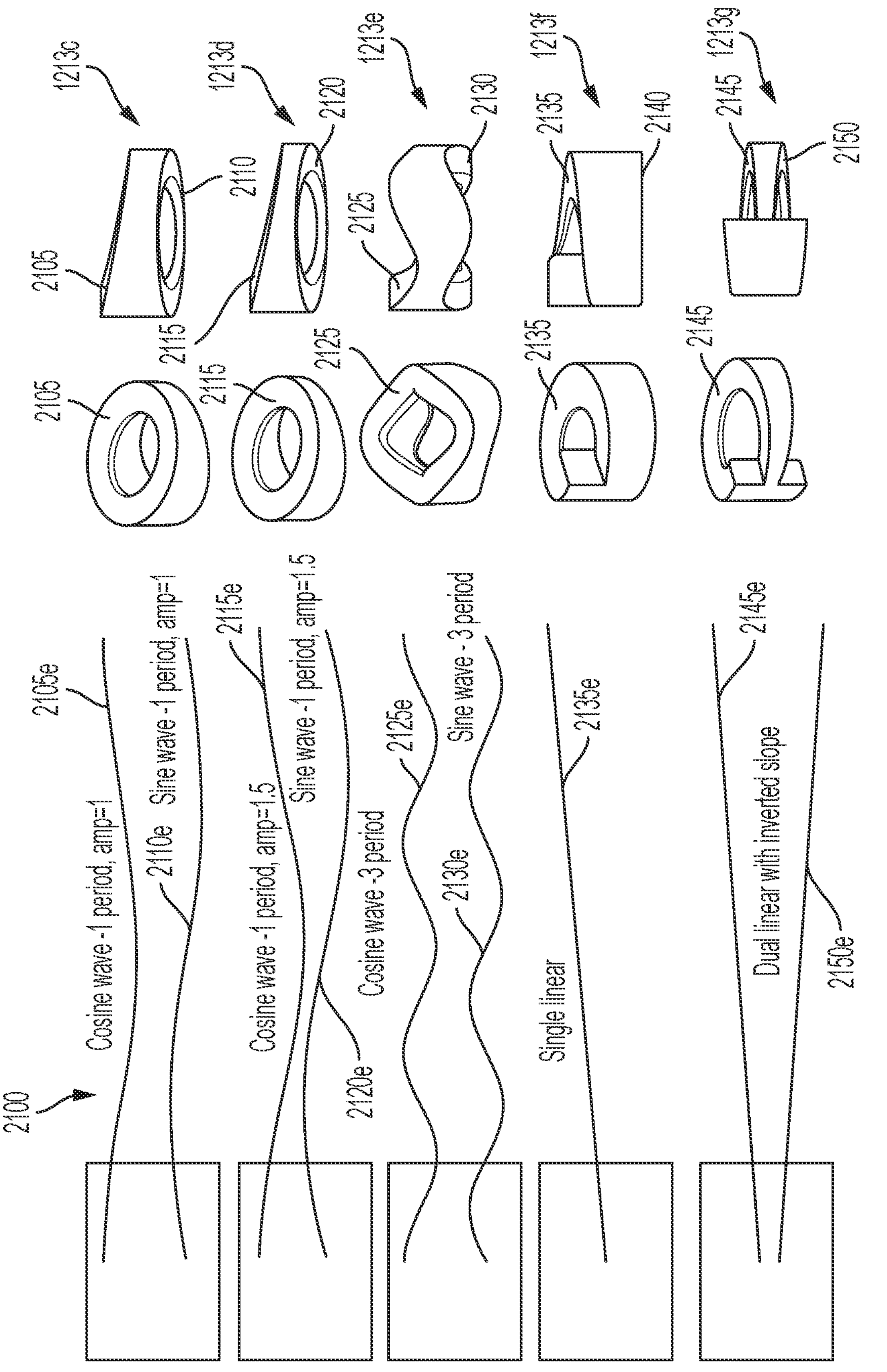
FIG. 21 illustrates the output of the anvil position sensor for various relief feature profiles as a function of anvil position.

FIG. 21 illustrates relief features 1213*c*-1213*g* with varying edge profiles 2100. The edge profile of the relief features 1213*c*-1213*g* define how the rotational position varies as if an edge of the respective relief feature was being unrolled. The edge profiles 2100 of the relief features 1213*c*-1213*g* illustrated in FIG. 21 are examples, however, it is contemplated that different edge profiles 2100 may be used to implement the relief features 1213*c*-1213*g*. The relief features 1213*c*-1213*g* may be raised features or recessed features. The illustrated relief features 1213*c*-1213*g* represent the material removed from the shaft 1212 to define recessed relief features or the material extending above the shaft 1212 to define raised relief features. In some embodiments, raised relief features are provided by mounting a sleeve on the shaft, as described below in reference to FIGS. 26A, 26B, 27A, 27B and 28. Each of the relief features 1213*c*-1213*g* generates a characteristic waveform in the anvil position sensor 218*c* that is used to determine the anvil rotational position. In some embodiments, multiple relief features 1213*c*-1213*g* are provided. In some embodiments, the multiple relief features 1213*c*-1213*g* are discontinuous to allow counting as well as rotational position determination.

Referring back to FIG. 21, a sinusoidal relief feature 1213*c* has a first surface 2105 that varies according to a cosine edge profile 2105*e* around the radius of the shaft 1212 and a second surface 2110 that varies according to a sine edge profile 2110*e* around the radius of the shaft 1212. The surfaces 2105, 2110 span one period of the respective sinusoidal edge profiles with a given amplitude. The one period may correspond to one full unrollment as discussed above (i.e., the edge of the respective relief feature was being unrolled one time).

A sinusoidal relief feature 1213*d* has a first surface 2115 that varies according to a cosine edge profile 2115*e* around the radius of the shaft 1212 and a second surface 2120 that varies according to a sine edge profile 2120*e* around the radius of the shaft 1212. The surfaces 2115, 2120 span one period of the respective sinusoidal profiles with an increased amplitude compared to the surfaces 2105, 2110 in the sinusoidal relief feature 1213*c*.

A sinusoidal relief feature 1213*e* has a first surface 2125 that varies according to a cosine edge profile 2125*e* around the radius of the shaft 1212 and a second surface 2130 that varies according to a sine edge profile 2130*e* around the radius of the shaft 1212. The surfaces 2115, 2120 span three periods of the respective sinusoidal edge profiles 2125*e*, 2130*e*.

A linear relief feature 1213*f* has a first surface 2135 that varies according to a linear edge profile 2135*e* around a radius of the shaft and a second surface 2140 that has an edge profile that does not vary around the radius of the shaft 1212.

A dual linear relief feature 1213*g* has a first surface 2145 that varies according to a linear edge profile 2145*e* around a radius of the shaft and a second surface 2150 that varies according to a linear edge profile 2150*e* around the radius of the shaft 1212 inverted with respect to the linear edge profile 2145*e* of the surface 2145.

Figure 22:
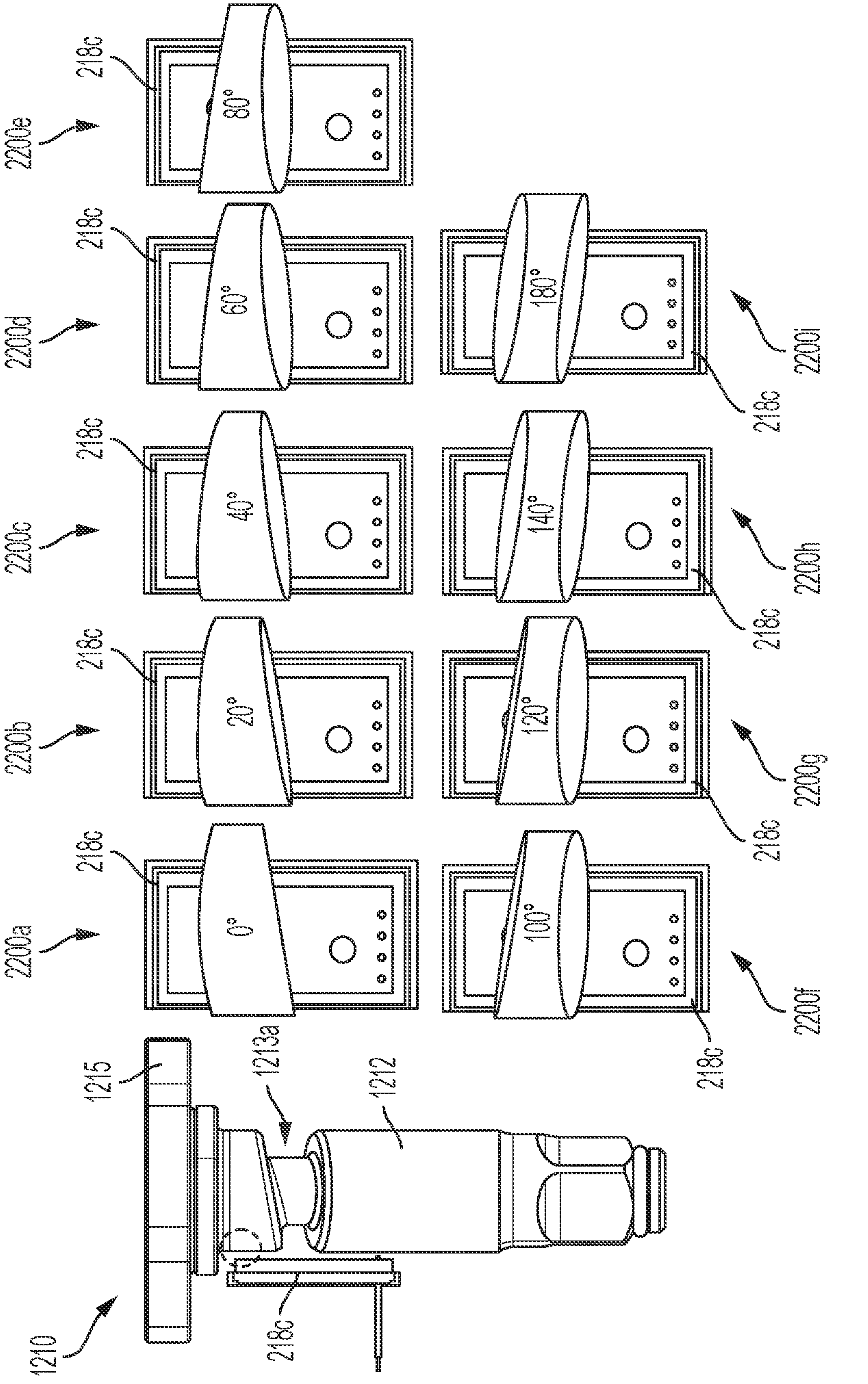
FIG. 22 illustrates the recessed relief feature of FIG. 19 at various anvil positions.

FIG. 22 illustrates the recessed relief feature 1213*a* of FIG. 19 at various anvil rotational positions. The edge profiles 2200*a*-2200*i* of the recessed relief feature 1213*a* are illustrated at rotational positions incremented by 20°. The edge profiles 2200*a*-2200*i* represent the material removed from the shaft 1212 to define the recessed relief feature 1213*a*.

Figure 23:
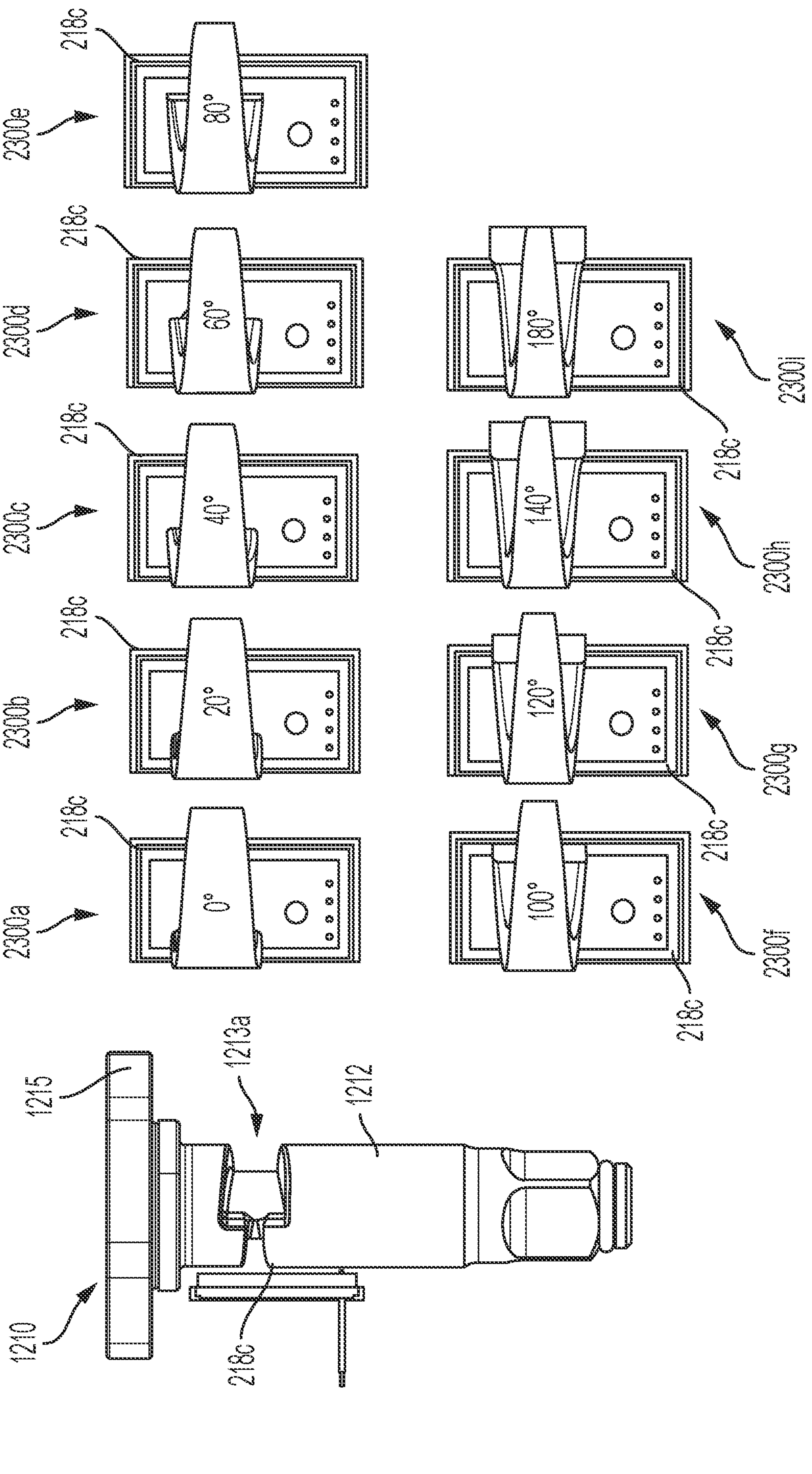
FIG. 23 illustrates a dual linear recessed relief feature at various anvil positions.

FIG. 23 illustrates the dual linear relief feature 1213*g* of FIG. 21 implemented as a recessed relief feature. The edge profiles 2300*a*-2300*i* of the relief feature 1213*g* are illustrated at rotational positions incremented by 20°. The edge profiles 2300*a*-2300*i* represent the material removed from the shaft 1212 to define the dual linear relief feature 1213*g*.

Figure 24:
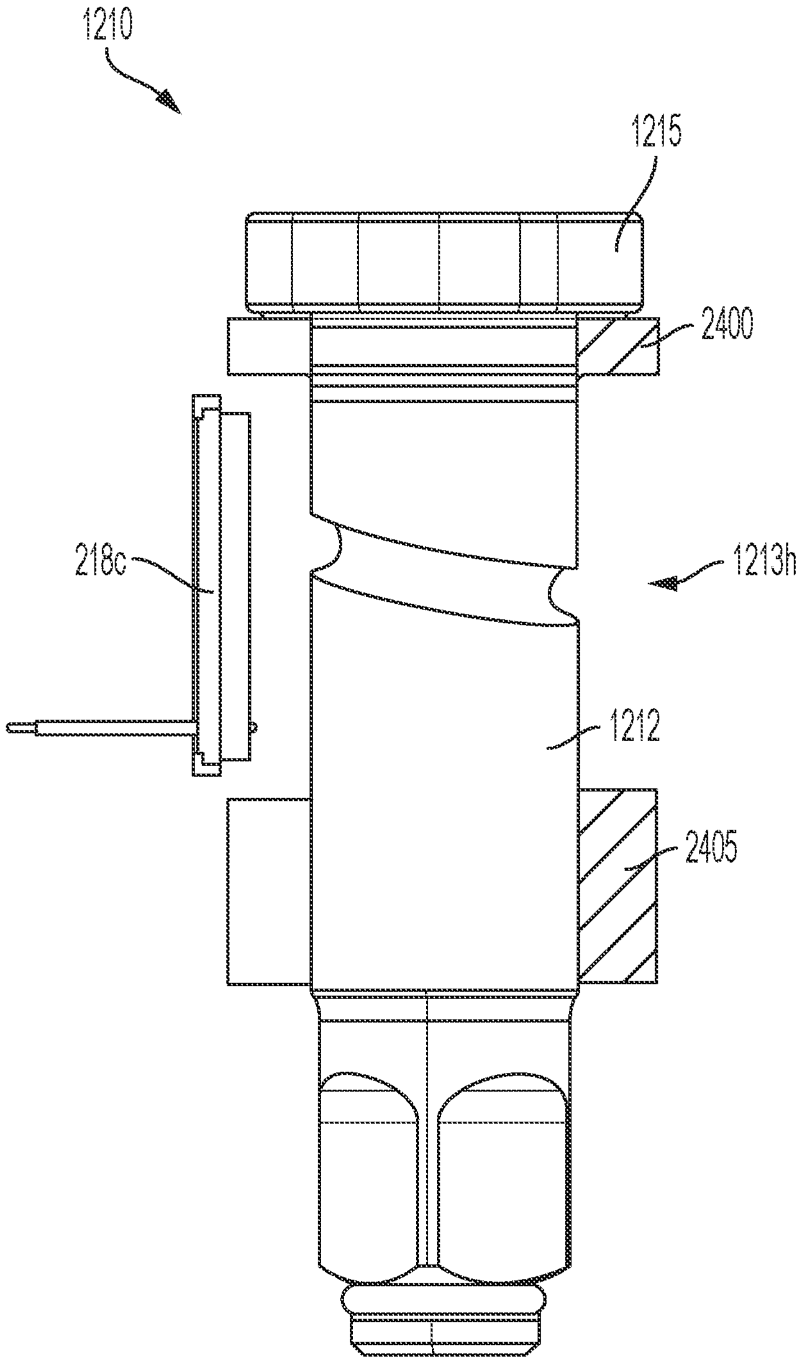
FIG. 24 illustrates an anvil position sensor and a groove relief feature of the power tool.

FIG. 24 illustrates the anvil position sensor 218*c* and a groove relief feature 1213*h* of the power tool 102. In some embodiments, the shaft 1212 is machined using a ball mill to form the groove relief feature 1213*h*. The groove relief feature 1213*h* of FIG. 24 has a constant pitch and depth, but the axial position of the groove varies with the rotational position of the shaft 1212. In some embodiments, the groove relief feature 1213*h* has a width of between 4.0 mm and 8.0 mm. The anvil 1210 is supported by support bushings 2400, 2405 positioned along the shaft 1212 outside the region where the groove relief feature 1213*h* is formed. The support bushings 2400, 2405 limit the ability of the shaft 1212 to pivot about an axis perpendicular to the axis of rotation. The support bushings 2400, 2405 may be employed with any of the relief features described herein. The spacing between the anvil position sensor 218*c* and the shaft 1212 may vary depending on whether the relief feature is raised or recessed.

Figure 25A:
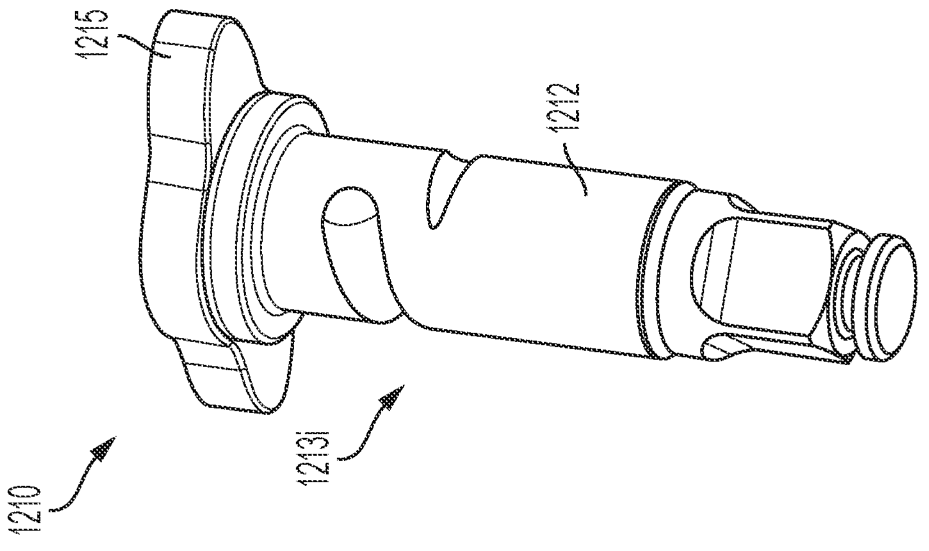
FIGS. 25A, 25B, and 25C illustrate an anvil position sensor and a groove relief feature of the power tool, where the groove relief feature has a depth and a pitch that varies with rotational position.
Figure 25B:
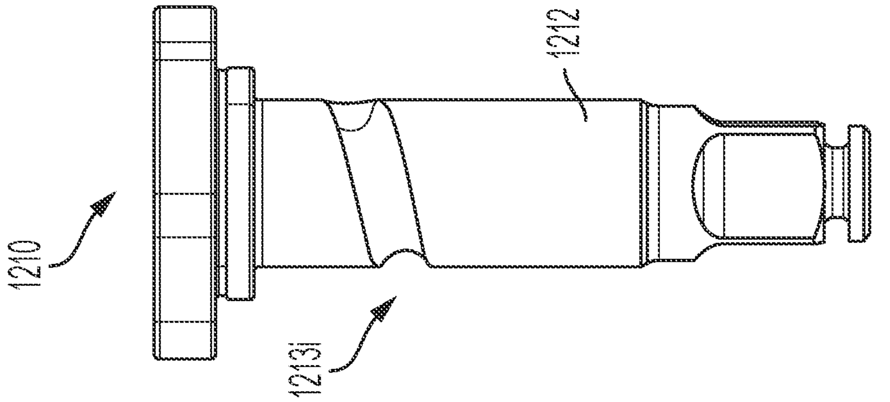
Figure 25C:
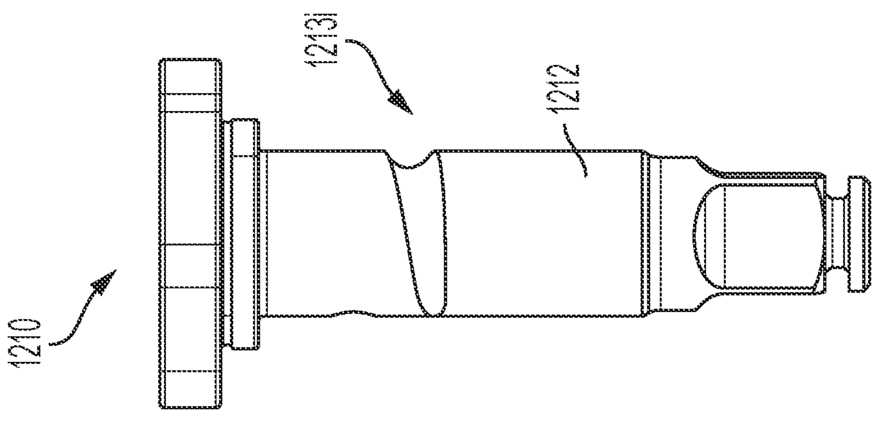

FIGS. 25A-25C illustrate the anvil position sensor 218*c* and a helix relief feature 1213*i* of the power tool 102, where the helix relief feature 1213*i* has a depth and a pitch that varies with rotational position. In some embodiments, the shaft 1212 is machined using a ball mill to form the helix relief feature 1213*i*. In some embodiments, the pitch of the helix relief feature 1213*i* decreases as a function of rotational position. For example, as illustrated in FIGS. 25A-25C, the pitch of the helix relief feature 1213*i* transitions from 15 mm to 3 mm in one rotation. In some embodiments, the depth of the helix relief feature 1213*i* decreases as a function of rotational position. For example, as illustrated in FIGS. 25A-25C, the depth of the helix relief feature 1213*i* transitions from 5.5 mm to 0 mm in one rotation. Varying the pitch or depth of the helix relief feature 1213*i* increases the differentiation in the output signal of the anvil position sensor 218*c* as a function of rotational position.

Figure 26B:
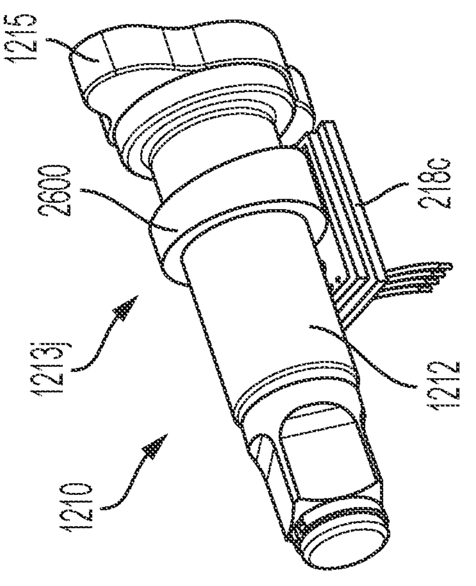
FIGS. 26A and 26B illustrate an anvil position sensor and a raised sleeve sinusoidal relief feature of the power tool.
Figure 26A:
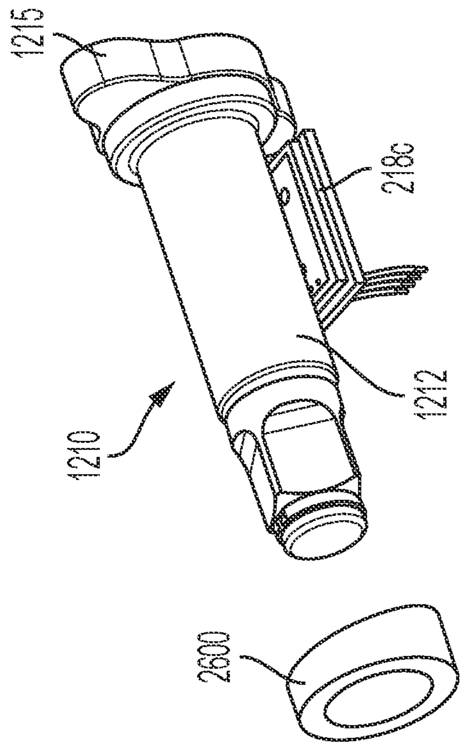

FIGS. 26A and 26B illustrate the anvil position sensor 218*c* and a raised sleeve sinusoidal relief feature 1213*j* of the power tool 102. The raised sleeve sinusoidal relief feature 1213*j* is formed by placing a sleeve 2600 having the desired profile on the shaft 1212 of the anvil 1210. The sleeve 2600 has a profile similar to the sinusoidal relief feature 1213*c* illustrated in FIG. 21, however, other profiles may be used.

Figure 27B:
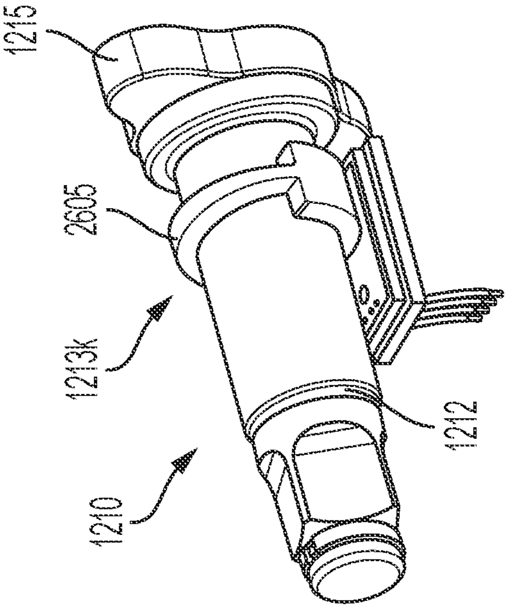
FIGS. 27A and 27B illustrate an anvil position sensor and a raised sleeve dual linear relief feature of the power tool.
Figure 27A:
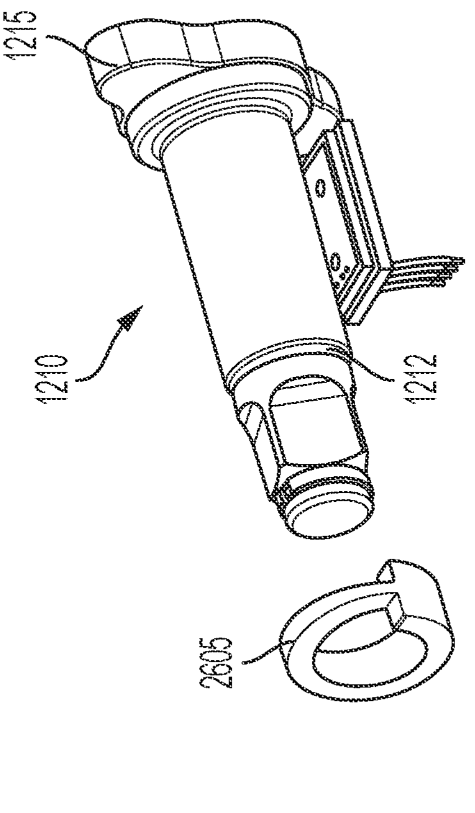

FIGS. 27A and 27B illustrate the anvil position sensor 218*c* and a raised sleeve dual linear relief feature 1213*k* of the power tool 102. The raised sleeve dual linear relief feature 1213*k* is formed by placing a sleeve 2605 having the desired profile on the shaft 1212 of the anvil 1210. The sleeve 2605 has a profile similar to the dual linear relief feature 1213*g* illustrated in FIG. 21.

Figure 28:
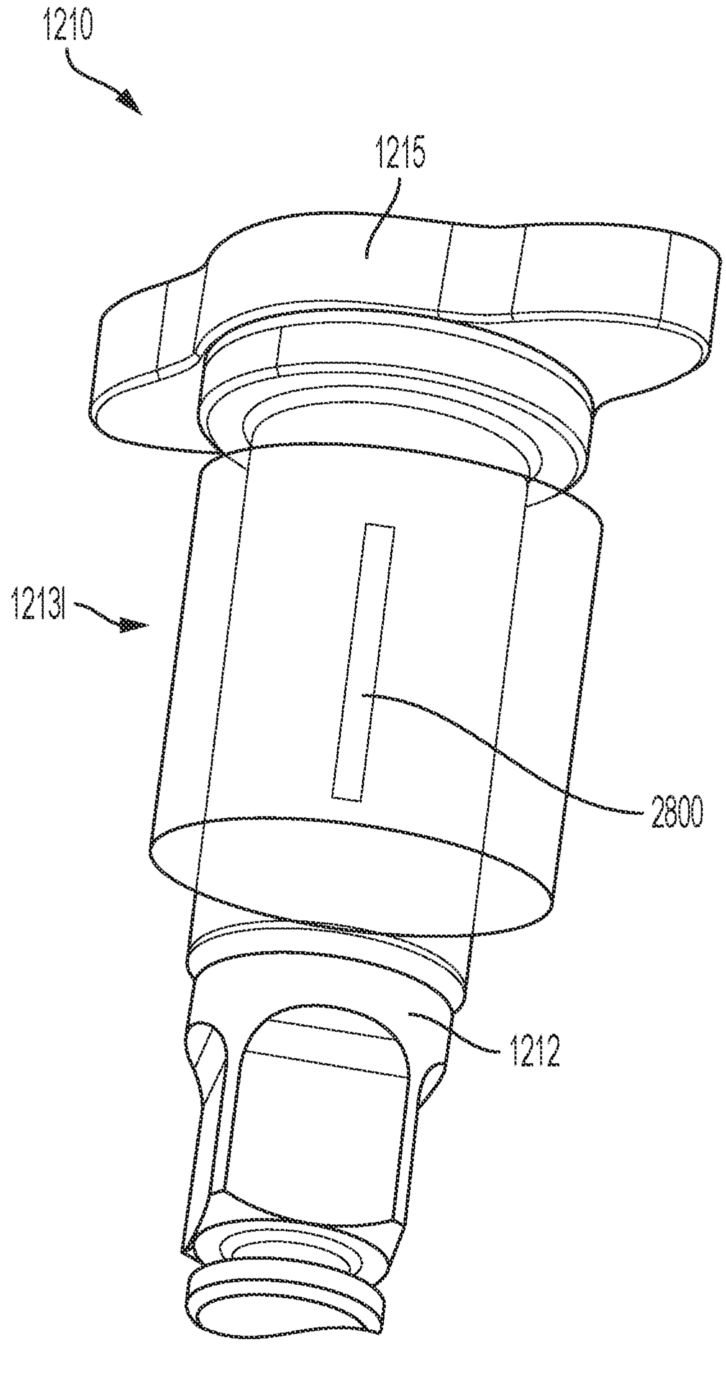
FIG. 28 illustrates a sleeved magnetic relief feature of the power tool.

FIG. 28 illustrates a sleeved relief feature 1213*l* of the power tool 102. The sleeved relief feature 1213*l* is formed by placing a printed circuit board assembly (PCBA) 2800 formed in the shape of a sleeve on the shaft 1212 of the anvil 1210. The PCBA 2800 includes at least one sensible feature that extends along the axis of rotation of the shaft 1212.

Some embodiments provide a method of calculating an output rotation angle of an output drive device of a motor to detect seating of a fastener and to change a driving parameter of the motor (i.e., speed) based on the calculated output rotation angle.

Some embodiments further provide a method of detecting the angular distance rotatably traveled by the shaft of a motor in between impacts on an impact driver or wrench to infer an output rotation angle of an output drive device of a motor to detect seating of a fastener and to change a driving parameter of the motor (i.e., speed) based on the calculated output rotation angle.

Some embodiments further provide a method of detecting an output rotation angle of an output drive device of a motor to change a driving parameter of the motor when a predetermined angle threshold is reached.

While a use of the various embodiments (e.g., the anvil detection methodology) is for measuring the anvil rotation, this methodology (especially when two or more 'edges' of detection are detected) may be used to estimate the anvil translation moving in and out of the impact. This translation, position, relative position, speed, acceleration, or other motion aspect may be used as a factor for the logic of seating a fastener or bolt. Larger translations, for instance, may imply a user is not pressing forward on the bolt and thus there may be less energy transfer per impact. In addition, while a use of the various embodiments is for measuring the anvil rotation, other rotational aspects such as rotational speed, rotational velocity, rotational acceleration, associated rotational energy, etc., may be used to control the logic for seating a fastener or bolt.

In some embodiments, the detection sensor may only focus on translation (e.g., using a ring as a relief feature without a profile associated with an angle). In some embodiments, both rotation and translation are detected. In some embodiments, to minimize translation of the anvil, a biasing means such as a spring may be used to bias the anvil forwards. This biasing may reduce the need to measure two sides to a ring to more appropriately derive rotation. In some embodiments, multiple sensors and ring profiles are used in conjunction, to measure defection over a length of an anvil. The defection over a length of an anvil may be used to estimate the torque on the output.

In some embodiments, it may be desired to have multiple sensors (and/or profiles) around or along the anvil. For instance, two sensors may be 180 degrees apart. Their readings may be combined to account for sensor imperfection(s) caused by the anvil shifting laterally or due to wobble/runout. In some embodiments, the use of multiple sensors may allow for a continuously valid reading even when one of the sensors may be 'invalid' or not resolute at a given anvil position. In some embodiments, having multiple sensors around or along the anvil provides redundancy.

In some embodiments, the target profile instead of being smooth may be stepped, disjointed, or discrete. In some embodiments, the target profile, instead of or in addition to a profile axially changing with angle, may change radially with angle (e.g., a spiral). Some sensors may respond to proximity and thus a radial (or rotational) change with angle may be desired.

In some embodiments, the sensor may be placed in-between one longer or two bearings. The placement in-between two supports may reduce lateral motion and/or wobble that could affect the sensor reading.

In some embodiments the profile(s) may be formed by one or more steps of preferably of decreasing diameter along the anvil. One or more of these steps may be used to engage with a limiting bushing or bearing. According to various embodiments, an impact anvil may have its forward motion restricted by a bushing or bearing. According to this embodiment, the profile formed may utilize this forwards surface in the profile design. In some embodiments, the profiles may be formed by having two materials where one material takes up a void of the other. This may be desirable for transferring load through a more forward material. It may be preferable to have a non-metal or non-magnetic material as one of the materials.

While various embodiments focus on an anvil of an impacting tool, other embodiments may use a variety of revolute objects (e.g., shafts, motor rotors, camshafts, crankshafts, gear systems, pinions, bushings, bearings, etc.), in a variety of power tools. According to various embodiments, aspects of the disclosure may also be extended to other rotary measurement for rotary (and/or translational) measurements including measuring wheels, rotary lasers, rotary linkages and cables (e.g., in string trimmers, drain cleaners), etc.

Thus, embodiments described herein provide, among other things, systems and methods for controlling power tools with impact mechanisms based on a drive angle from impacting. Various features and advantages of the invention are set forth in the following claims.

We claim:

1. A power tool comprising:

a housing;

a brushless direct current (DC) motor within the housing, wherein the brushless DC motor includes a rotor and a stator, wherein the rotor is coupled to a motor shaft to produce a rotational output;

an impact mechanism including:

a hammer coupled to the motor shaft, and an anvil configured to receive impacts from the hammer, wherein the anvil includes an anvil shaft having a circumference and a relief feature provided on the anvil shaft, and wherein the relief feature has an edge profile that extends along the circumference of the anvil shaft and varies in an axial direction of the anvil shaft;

an output drive device coupled to the anvil shaft and configured to rotate to perform a task; and a position sensor positioned adjacent the relief feature, the position sensor configured to sense a physical characteristic of the relief feature and to generate an output signal indicative of a position of the anvil based on the sensed physical characteristic of the relief feature; and a controller connected to the position sensor and configured to:

calculate a drive angle of the anvil based on the output signal indicative of the position of the anvil, and control the brushless DC motor based on the drive angle of the anvil.

2. The power tool of claim 1, wherein, to calculate the drive angle, the controller is configured to:

determine a first rotational position of the anvil upon a first impact between the hammer and the anvil based on the output signal, determine a second rotational position of the anvil upon a second impact between the hammer and the anvil based on the output signal, and determine an output drive angle experienced by the output drive device based on the first rotational position and the second rotational position.

3. The power tool of claim 2, wherein, to determine the output drive angle experienced by the output drive device based on the first rotational position and the second rotational position, the controller is configured to:

determine a difference between the second rotational position and the first rotational position, and subtract a predetermined angle from the difference between the second rotational position and the first rotational position, and determine the output drive angle experienced by the output drive device based on the difference between the second rotational position and the first rotational position subtracted by the predetermined angle.

4. The power tool of claim 2, wherein the controller is configured to:

control the brushless DC motor based on the output drive angle experienced by the output drive device, wherein, to control the brushless DC motor based on the output drive angle, the controller is further configured to adjust a speed of the brushless DC motor based on the output drive angle experienced by the output drive device.

5. The power tool of claim 1, wherein, to control the brushless DC motor based on the drive angle of the anvil, the controller is configured to:

determine a rotation count by accumulating and reduce a speed of the brushless DC motor in response to determining that the rotation count is greater than a rotation threshold.

6. The power tool of claim 1, further comprising:

a transceiver coupled to the controller, wherein the controller is configured to receive, wirelessly from an external device via the transceiver, a rotation threshold.

7. The power tool of claim 1, wherein, to control the brushless DC motor based on the drive angle, the controller is configured to:

determine whether the drive angle of the anvil is less than a drive angle threshold, increment an impact counter for a detected impact in response to determining that the drive angle of the anvil is less than the drive angle threshold, determine whether the impact counter has reached an impact counter threshold, and reduce a speed of the brushless DC motor in response to determining that the impact counter has reached the impact counter threshold.

8. The power tool of claim 7, further comprising:

a transceiver coupled to the controller, wherein the controller is configured to receive, wirelessly from an external device via the transceiver, a finishing speed, and wherein the controller, to reduce the speed of the brushless DC motor in response to determining that the impact counter has reached the impact counter threshold, is configured to reduce the speed of the brushless DC motor from a first speed to the finishing speed.

9. The power tool of claim 1, wherein:

the relief feature includes a raised relief feature, wherein the raised relief feature includes at least one of a sleeve positioned on the anvil shaft or a protruding feature defined on the anvil shaft.

10. The power tool of claim 1, wherein:

the relief feature includes a recessed feature defined in the anvil shaft.

11. The power tool of claim 1, further comprising:

a transmitting circuit trace configured to generate a magnetic field to generate eddy currents in the anvil shaft, wherein the eddy currents are affected by the edge profile of the relief feature along the anvil shaft.

12. The power tool of claim 1, wherein the relief feature is configured to generate a characteristic waveform in the anvil position sensor that is used to determine a radial position of the anvil.

13. The power tool of claim 1, wherein the relief feature is discontinuous to allow rotations to be counted and radial position determination.

14. The power tool of claim 1, wherein the relief feature includes:

a sinusoidal relief feature including a first surface that varies according to a cosine edge profile around a radius of the anvil shaft and a second surface that varies according to a sine edge profile around the radius of the anvil shaft.

15. The power tool of claim 1, wherein the relief feature includes:

a linear relief feature including at least one surface that varies according to a linear edge profile around a radius of the anvil shaft.

16. The power tool of claim 1, wherein the relief feature includes:

a groove relief feature having a constant pitch and depth, wherein an axial position of the groove relief feature varies with the radial position of the anvil shaft.

17. The power tool of claim 1, wherein the relief feature includes:

a helix relief feature having a depth and a pitch that varies with radial position, wherein the pitch of the helix relief feature decreases as a function of radial position.

18. A method of controlling a power tool comprising:

driving a brushless direct current (DC) motor, wherein the brushless DC motor includes a rotor and a stator, wherein the rotor is coupled to a motor shaft to produce a rotational output;

impacting an anvil of an impact mechanism by a hammer of the impact mechanism that is coupled to the motor shaft to rotate an output drive device coupled to the anvil, wherein the anvil includes an anvil shaft having a circumference and a relief feature provided on the anvil shaft, and the relief feature has an edge profile that extends along the circumference of the anvil shaft and varies in an axial direction of the anvil shaft;

sensing a position of the anvil by a position sensor, the position sensor positioned adjacent the relief feature and configured to sense a physical characteristic of the relief feature, wherein the position sensor is configured to generate an output signal indicative of the position of the anvil based on the sensed physical characteristic of the relief feature;

calculating a drive angle of the anvil based on the position of the anvil; and controlling the brushless DC motor based on the drive angle of the anvil.

19. The method of claim 18, wherein the controlling the brushless DC motor based on the drive angle of the anvil includes:

determining a rotation count by accumulating a value for each calculated drive angle below a drive angle threshold of a plurality of calculated drive angles, and reducing a speed of the brushless DC motor in response to determining that the rotation count is greater than a rotation threshold.

20. The method of claim 18, wherein:

the relief feature includes a raised relief feature, wherein the raised relief feature includes at least one of a sleeve positioned on the anvil shaft or a protruding feature defined on the anvil shaft.

21. A power tool comprising:

a housing;

a brushless direct current (DC) motor within the housing, wherein the brushless DC motor includes a rotor and a stator, wherein the rotor is coupled to a motor shaft to produce a rotational output;

an impact mechanism including:

a hammer coupled to the motor shaft, and an anvil configured to receive impacts from the hammer, wherein the anvil includes an anvil shaft having a circumference and a relief feature provided on the anvil shaft, and wherein the relief feature has an edge profile that extends along the circumference of the anvil shaft and varies in an axial direction of the anvil shaft;

an output drive device coupled to the anvil shaft and configured to rotate to perform a task; and a position sensor positioned adjacent the relief feature, the position sensor being configured to sense a physical characteristic of the relief feature and to generate an output signal indicative of a position of the anvil based on the sensed physical characteristic of the relief feature; and a controller connected to the position sensor and configured to:

receive a first position signal from the position sensor at a first time, receive a second position signal from the position sensor at a second time, calculate a drive angle of the anvil based on the first position signal and the second position signal, determine an output drive angle experienced by the output drive device based on the drive angle of the anvil, and control the brushless DC motor based on the output drive angle experienced by the output drive device.

22. The power tool of claim 21, wherein:

the relief feature includes a raised relief feature, wherein the raised relief feature includes at least one of a sleeve positioned on the anvil shaft or a protruding feature defined on the anvil shaft.

* * * * *